US011035657B2

(12) United States Patent
Hara et al.

(10) Patent No.: US 11,035,657 B2
(45) Date of Patent: Jun. 15, 2021

(54) THREADED-HOLE INSPECTION DEVICE

(71) Applicant: DAI-ICHI SOKUHAN WORKS CO., Ojiya (JP)

(72) Inventors: Mamoru Hara, Ojiya (JP); Yasuo Sato, Ojiya (JP); Atsushi Sato, Ojiya (JP); Tetsuya Horiuchi, Ojiya (JP); Teruyuki Miyashita, Ojiya (JP); Takao Hayashi, Ojiya (JP); Kenji Miyamori, Higashi-Osaka (JP); Koji Miyamori, Higashi-Osaka (JP); Mamoru Watanabe, Bangkok (TH)

(73) Assignee: DAI-ICHI SOKUHAN WORKS CO., Ojiya (JP)

( * ) Notice: Subject to any disclaimer, the term of this patent is extended or adjusted under 35 U.S.C. 154(b) by 231 days.

(21) Appl. No.: 16/345,476

(22) PCT Filed: Oct. 30, 2017

(86) PCT No.: PCT/JP2017/039150
§ 371 (c)(1),
(2) Date: Apr. 26, 2019

(87) PCT Pub. No.: WO2018/084114
PCT Pub. Date: May 11, 2018

(65) Prior Publication Data
US 2019/0293401 A1    Sep. 26, 2019

(30) Foreign Application Priority Data

Nov. 7, 2016  (JP) .............................. JP2016-217348
Nov. 7, 2016  (JP) .............................. JP2016-217350

(51) Int. Cl.
*G01B 3/48*     (2006.01)
*G01B 5/18*     (2006.01)

(52) U.S. Cl.
CPC ................. *G01B 3/48* (2013.01); *G01B 5/18* (2013.01)

(58) Field of Classification Search
CPC ............ G01B 3/48; G01B 5/18; G01B 5/204
See application file for complete search history.

(56) References Cited

U.S. PATENT DOCUMENTS 4,856,198 A * 8/1989 Hattan ..................... G01B 3/48
33/199 R
4,934,059 A * 6/1990 Green ...................... G01B 3/48
33/199 R
(Continued)

FOREIGN PATENT DOCUMENTS

JP     61-143005 U    9/1986
JP     7-301505 A    11/1995
(Continued)

OTHER PUBLICATIONS

International Search Report for PCT/JP2017/039150 dated Jan. 23, 2018 [PCT/ISA/210].

*Primary Examiner* — Yaritza Guadalupe-McCall
(74) *Attorney, Agent, or Firm* — Sughrue Mion, PLLC

(57) ABSTRACT

Provided is a threaded-hole inspection device having high inspection precision. An incomplete thread ridge portion of a gauge portion 5 of a thread gauge 1 is removed, a phase-positioning portion 8 for positioning a tip-side start point 7 of a complete thread ridge at a prescribed phase when the thread gauge 1 is mounted on a rotating-shaft portion 2 is provided to a fastening portion 6 of the thread gauge 1 that is to be fastened to the rotating-shaft portion 2, and a phase-positioning engaging portion 9 that is to engage with the phase-positioning portion 8 is provided to the rotating-shaft portion 2. A depth of a threaded hole 4 to be inspected is measured on the basis of a number of rotations and thread pitch of a rotating-shaft-feeding mechanism 18 that, via threaded engagement, feeds the rotating-shaft por- (Continued)

tion 2 in a threaded-hole-approaching direction, which is a direction of approach toward the threaded hole 4, the rotating-shaft portion 2 being caused to rotate by a rotary drive portion 3, and on the basis of a distance over which an outward-moving portion 23 moves outward from the threaded hole, and the depth of the threaded hole 4 is calculated.

10 Claims, 16 Drawing Sheets

(56) References Cited

U.S. PATENT DOCUMENTS

| | | | | |
|---|---|---|---|---|
| 5,199,175 | A * | 4/1993 | Green | G01B 3/48 |
| | | | | 33/199 R |
| 8,888,568 | B2 * | 11/2014 | Stein | B24B 23/02 |
| | | | | 451/513 |
| 2001/0034948 | A1 * | 11/2001 | Matsumiya | G01B 7/012 |
| | | | | 33/553 |
| 2011/0086581 | A1 * | 4/2011 | Stein | B23G 1/36 |
| | | | | 451/340 |
| 2018/0292294 | A1 * | 10/2018 | Yamada | G01M 17/06 |
| 2019/0293401 | A1 * | 9/2019 | Hara | G01B 3/48 |

FOREIGN PATENT DOCUMENTS

| | | |
|---|---|---|
| JP | 7-332906 A | 12/1995 |
| JP | 2015-158411 A | 9/2015 |
| WO | 01/67032 A1 | 9/2001 |

* cited by examiner

THREADED-HOLE INSPECTION DEVICE

CROSS REFERENCE TO RELATED APPLICATIONS

This application is a National Stage of International Application No. PCT/JP2017/039150, filed on Oct. 30, 2017, which claims priority from Japanese Patent Application No. 2016-217348, filed on Nov. 7, 2016, and Japanese Patent Application No. 2016-217350, filed on Nov. 7, 2016.

TECHNICAL FIELD

The present invention relates to a threaded-hole inspection device for inspecting a threaded hole that has been machined.

BACKGROUND ART

In the past, when inspecting threaded holes that have been machined, an operator has threaded a thread gauge into each of the threaded holes one at a time and confirmed, inter alia, whether the thread gauge has been smoothly threaded into the threaded hole or whether the threaded gauge has been threaded up to a prescribed position. The operator thereby assesses whether the threaded hole has been satisfactorily formed according to a given specification.

However, such manual inspection of threaded holes presents a problem in that the operator may make an incorrect assessment because they have to make a decision on an intuitive basis. Moreover, an inspection operation in which the operator threads a thread gauge into a threaded hole is a very simple operation, and repeatedly performing such a simple operation for an extended period of time makes the operation burdensome for the operator.

Therefore, to resolve such a situation, inspection of threaded holes has increasingly become automated and various threaded-hole inspection devices have been proposed. Many of these devices are configured so that a thread gauge is mounted on a rotating-shaft portion that is provided so as to be capable of being made to rotate by a motor, the thread gauge is progressively twisted into a threaded hole to be inspected, a depth of the threaded hole is calculated on the basis of a thread pitch of the twisted thread gauge and a number of rotations made by the thread gauge on being twisted, and an assessment of whether the depth of the threaded hole is satisfactory is made in accordance with the calculated result.

The number of rotations made by the thread gauge on being twisted when calculations are made of the depth of the threaded hole is the number of rotations by which the thread gauge has rotated from when meshing and twisting (threading) of a complete thread ridge of the thread gauge into the threaded hole is started until the twisting (threading) is complete. However, conventional threaded-hole inspection devices are not provided with means for positioning an attachment orientation of the thread gauge relative to the rotating-shaft portion; they are configured so that the thread gauge is attached to the rotating-shaft portion in a discretionary orientation. Therefore, when the thread gauge is mounted on the rotating-shaft portion, a phase difference is created between a position of a start point of the complete thread ridge of the thread gauge and a thread-start position in the threaded hole to be inspected, and a number of rotations corresponding to the phase difference, i.e., a number of rotations required for the thread gauge to mesh with the threaded hole, is added into the calculation of the depth of the threaded hole, making it impossible to accurately calculate the depth of the threaded hole. Therefore, it has been necessary, when mounting the thread gauge on the rotating-shaft portion, for the start point of the complete thread ridge of the thread gauge to be visually confirmed each time to a position having a phase matching that of a prescribed position, e.g., the thread-start position in the threaded hole, so as to prevent a phase difference from being created.

However, in conventional thread gauges, an incomplete thread ridge remains on a gauge portion tip, and it is difficult to visually confirm the position of the start point of the complete thread ridge. Moreover, it is not easy to cause the positions to conform as described above, and a phase difference may be created even if position matching is intended. In addition, due to the presence of the incomplete thread ridge, adverse events frequently occur in which the incomplete thread ridge readily cuts into the threaded hole and becomes difficult to remove when the gauge portion has been threaded into the threaded hole.

Conventional thread gauges are configured so that an attachment portion for attachment to the rotating-shaft portion is formed in a tapered shape, which causes an amount of protrusion of the thread gauge occurring when the thread gauge is mounted on the rotating-shaft portion to be fixed. However, the amount of protrusion occasionally differs depending on machining precision on a thread-gauge side and on a rotating-shaft-portion side, raising concerns pertaining to reliability of inspection.

In the past, various threaded-hole inspection devices have been proposed in order to automate inspection of threaded holes. However, many of these conventional threaded-hole inspection devices (referred to as conventional devices below) are configured so that a thread gauge suited to a threaded hole to be inspected is mounted on a rotating-shaft portion that is provided so as to be capable of being made to rotate by a motor, a rotary drive portion is driven to cause the rotating-shaft portion to rotate, the thread gauge mounted on the rotating-shaft portion is twisted by rotation into the threaded hole to be inspected, the depth of the threaded hole is calculated on the basis of a thread pitch of the thread gauge twisted into the threaded hole and a number of rotations made by the thread gauge on being twisted, and the depth of the threaded hole is inspected on the basis of the calculated result.

The number of rotations made by the thread gauge on being twisted when calculations are made of the depth of the threaded hole is the number of rotations by which the thread gauge has rotated from when meshing and twisting (threading) of a complete thread ridge of the thread gauge into the threaded hole is started until the twisting (threading) is complete. However, conventional threaded-hole inspection devices are not provided with means for positioning an attachment orientation of the thread gauge relative to the rotating-shaft portion; they are configured so that the thread gauge is attached to the rotating-shaft portion in a discretionary orientation. Therefore, when the thread gauge is mounted on the rotating-shaft portion, a phase difference is created between a position of a start point of the complete thread ridge of the thread gauge and a thread-start position in the threaded hole to be inspected, and a number of rotations corresponding to the phase difference, i.e., a number of rotations required for the thread gauge to mesh with the threaded hole is added into the calculation of the depth of the threaded hole, making it impossible to accurately calculate the depth of the threaded hole and raising concerns pertaining to reliability of inspection.

Furthermore, when one thread gauge is replaced with a different thread gauge having a different thread pitch in these conventional devices, a numeric value of the thread pitch that is set in a threaded hole depth computation unit must be reset (re-inputted), and adverse inspection events have occasionally occurred due to the operator forgetting to reset the thread pitch or incorrectly resetting the thread pitch.

SUMMARY OF THE INVENTION

Problem to be Solved by the Invention

The present invention was contrived in view of the circumstances described above. An object of the present invention is to provide an innovative threaded-hole inspection device in which: when a thread gauge is to be mounted on a rotating-shaft portion, mounting is achieved in a state in which a position of a start point of a complete thread ridge of the thread gauge is positioned so as to always have a fixed phase difference with respect to a thread-start position in a threaded hole to be inspected; adverse events involving cutting into the threaded hole when the thread gauge is fully threaded do not occur; an amount of protrusion of the thread gauge is fixed; the threaded-hole inspection device has exceptional inspection precision and is configured so that the reproducibility of measurement is high; and a depth of the threaded hole can be accurately measured irrespective of whether there is a phase difference between the tip-side start point of the complete thread ridge of the thread gauge and the thread-start position in the threaded hole, and moreover it is unnecessary to reset the thread pitch even if the thread gauge is replaced with (exchanged for) a different thread gauge having a different thread pitch, and there is no risk of adverse inspection events occurring due to forgetting to reset the thread pitch or incorrectly resetting the thread pitch.

Means for Solving the Problem

A gist of the present invention is described with reference to the attached drawings.

An invention according to a first aspect pertains to a threaded-hole inspection device comprising a thread gauge 1, a rotating-shaft portion 2 on which the thread gauge 1 is detachably mounted, and a rotary drive portion 3 that rotates the rotating-shaft portion 2 to rotate the thread gauge 1 mounted on the rotating-shaft portion 2, the threaded-hole inspection device being configured so that: the thread gauge 1 is twisted into a threaded hole 4 to be inspected; a depth dimension of the threaded hole 4 is measured on the basis of a number of rotations from when twisting of the thread gauge 1 into the threaded hole 4 starts until the twisting is complete, and on the basis of a thread pitch of the thread gauge 1; and the depth dimension of the threaded hole 4 is inspected; wherein the threaded-hole inspection device is characterized in that: the thread gauge 1 is configured so that a gauge portion 5 to be twisted into the threaded hole 4 is provided to a tip portion of the thread gauge 1, and a fastening portion 6 that fastens to the rotating-shaft portion 2 is provided to a base portion of the thread gauge 1; the gauge portion 5 is configured so that an incomplete thread ridge portion produced on a tip portion of the gauge portion 5 during formation of a thread is removed; the fastening portion 6 is configured so that a phase-positioning portion 8 is provided thereto, the phase-positioning portion 8 positioning a tip-side start point 7 of a complete thread ridge portion of the gauge portion 5 at a prescribed phase when the thread gauge 1 is mounted on the rotating-shaft portion 2; and the rotating-shaft portion 2 is provided with a phase-positioning engaging portion 9 that engages with the phase-positioning portion 8.

An invention according to a second aspect pertains to the threaded-hole inspection device according to the first aspect, characterized in that a plurality of thread gauges 1 having different pitches and outer diameters are provided, and the thread gauges 1 are configured to be replaceably mounted.

An invention according to a third aspect pertains to the threaded-hole inspection device according to the first or second aspect, characterized in that the phase-positioning portion 8 is provided at a fixed phase position relative to the tip-side start point 7 of the complete thread ridge.

An invention according to a fourth aspect pertains to the threaded-hole inspection device according to the first or second aspect, characterized in that the thread gauge 1 is configured so that: there is provided a contacting engaging portion 10 that comes into contact and engages with the rotating-shaft portion 2 when the fastening portion 6 is inserted and mounted, or fitted and mounted, into the rotating-shaft portion 2; and by causing the contacting engaging portion 10 to come into contact and engage with the rotating shaft portion 2 and inserting and mounting, or fitting and mounting, the fastening portion 6 into the rotating-shaft portion 2, an amount of insertion or an amount of fitting of the fastening portion 6 into the rotating-shaft portion 2 is fixed, and an amount of protrusion of the thread gauge 1 mounted on the rotating-shaft portion 2 is fixed.

An invention according to a fifth aspect pertains to a threaded-hole inspection device characterized by having: a thread gauge 1; a rotating-shaft portion 2 on which the thread gauge 1 is detachably mounted; a rotary drive portion 3 that rotates the rotating-shaft portion 2 to rotate the thread gauge 1 mounted on the rotating-shaft portion 2; a rotating-shaft-feeding mechanism 18 that, via threaded engagement, feeds the rotating-shaft portion 2 in a threaded-hole-approaching direction, which is a direction of approach toward a threaded hole 4 to be inspected, the rotating-shaft portion 2 being caused to rotate by the rotary drive portion 3; and an outward-moving portion 23 that, when a difference is created between a distance over which the rotating-shaft portion 2 fed by the rotating-shaft-feeding mechanism 18 is fed and a distance over which the thread gauge 1 mounted on the rotating-shaft portion 2 advances, moves outward from the threaded hole in a direction opposite to the threaded-hole-approaching direction commensurately with the difference in the distances; the threaded-hole inspection device being configured so that a depth of the threaded hole 4 is measured on the basis of a number of rotations and thread pitch of the rotating-shaft-feeding mechanism 18 and on the basis of a distance over which the outward-moving portion 23 moves outward from the threaded hole, and the depth of the threaded hole 4 is inspected.

An invention according to a sixth aspect pertains to the threaded-hole inspection device according to the fifth aspect, characterized in that: the rotating-shaft-feeding mechanism 18 is composed of a threaded part 19 provided to the rotating-shaft portion 2, and a nut 20 that is threaded onto the threaded part 19; the nut 20 being configured to be provided to the outward-moving portion 23 in a state in which rotation relative to a moving-housing portion 21 in which the rotating-shaft portion 2 is arranged is prevented, and also to be provided so as to be capable of moving vertically.

An invention according to a seventh aspect pertains to the threaded-hole inspection device according to the fifth or sixth aspect, characterized in that the outward-moving portion 23 is positioned at and urged toward a prescribed position by positioning urging means, and is configured so that, when a difference is created between the distance over which the rotating-shaft portion 2 is fed and the distance over which the thread gauge 1 advances, the outward-moving portion 23 moves outward from the threaded hole commensurately with the difference in distance, against an urging force of the positioning urging means.

An invention according to an eighth aspect pertains to the threaded-hole inspection device according to the fifth or sixth aspect, characterized by having outward-movement-amount-measuring means 24 for measuring a distance over which the outward-moving portion 23 moves, and by being configured so that the depth of the threaded hole 4 is measured on the basis of the number of rotations and thread pitch of the rotating-shaft-feeding mechanism 18 and on the basis of the distance over which the outward-moving portion 23 moves as measured by the outward-movement-amount-measuring means 24.

An invention according to a ninth aspect pertains to the threaded-hole inspection device according to the eighth aspect, characterized in that the outward-movement-amount-measuring means 24 is configured to measure a distance gap with respect to the outward-moving portion 23 and acquire an amount of change in the distance gap as the distance over which the outward-moving portion 23 moves.

An invention according to a tenth aspect pertains to the threaded-hole inspection device according to the fifth aspect, characterized by having number-of-rotations-measuring means that measures the number of rotations of the rotating-shaft-feeding mechanism 18, outward-movement-amount-measuring means 24 for measuring the distance over which the outward-moving portion 23 moves, and a threaded hole depth computation unit that calculates the depth of the threaded hole 4, the threaded hole depth computation unit being configured to: subtract the distance over which the outward-moving portion 23 moves as inputted from the outward-movement-amount-measuring means 24 from the distance over which the rotating-shaft portion 2 is fed, which is acquired on the basis of the number of rotations of the rotating-shaft-feeding mechanism 18 as inputted from the rotation-measuring means and a preset thread pitch of the rotating-shaft-feeding mechanism 18; acquire a depth dimension of the threaded hole 4; and inspect the depth of the threaded hole 4 on the basis of the depth dimension of the threaded hole 4 that was computed and acquired by the threaded hole depth computation unit.

Effect of the Invention

Because the present invention is configured as described above, when a thread gauge is to be mounted on a rotating-shaft portion, the thread gauge is mounted in a state in which a position of a start point of a complete thread ridge of the thread gauge is positioned so as to always have a fixed phase difference with respect to a thread-start position in a threaded hole to be inspected.

Specifically, a position of a tip-side start point of the complete thread ridge on a gauge portion of the thread gauge is clarified because an incomplete thread ridge portion of the gauge portion is removed, making it possible to easily confirm the position of the tip-side start point of the complete thread ridge even by visual means. Moreover, a risk of an incomplete thread ridge portion cutting into the threaded hole and creating an adverse event in a separation operation when the gauge portion is fully threaded into the threaded hole is reduced as much as possible.

In addition, for example, if a gauge-portion-phase-positioning portion is provided to the thread gauge with reference to the tip-side start point of the complete thread ridge, the tip-side start point having been clarified by removing the incomplete thread ridge, then it will be possible to arrange the tip-side start point of the complete thread ridge at a prescribed phase position and mount the thread gauge on the rotating shaft portion. This makes it possible to arrange the tip-side start point of the complete thread ridge of the thread gauge at a position having a phase difference of 0° relative to the thread-start position in the threaded hole to be inspected when the thread gauge is mounted on the rotating-shaft portion. In addition, an excessive number of rotations corresponding to the phase difference is not added when measurements are made of a depth of the threaded hole, a depth dimension of the threaded hole can be accurately measured, and inspection precision is improved.

The present invention is an innovative threaded-hole inspection device in which the depth of the threaded hole can be accurately measured irrespective of whether there is a phase difference between the tip-side start point of the complete thread ridge of the thread gauge mounted on the rotating-shaft portion and the thread-start position in the threaded hole, and moreover in which it is unnecessary to reset the thread pitch even if one thread gauge is replaced with (exchanged for) a different thread gauge having a different thread pitch and with which there is no risk of adverse inspection events occurring due to forgetting to reset the thread pitch or incorrectly resetting the thread pitch.

BEST MODE FOR CARRYING OUT THE INVENTION

Figure 1:
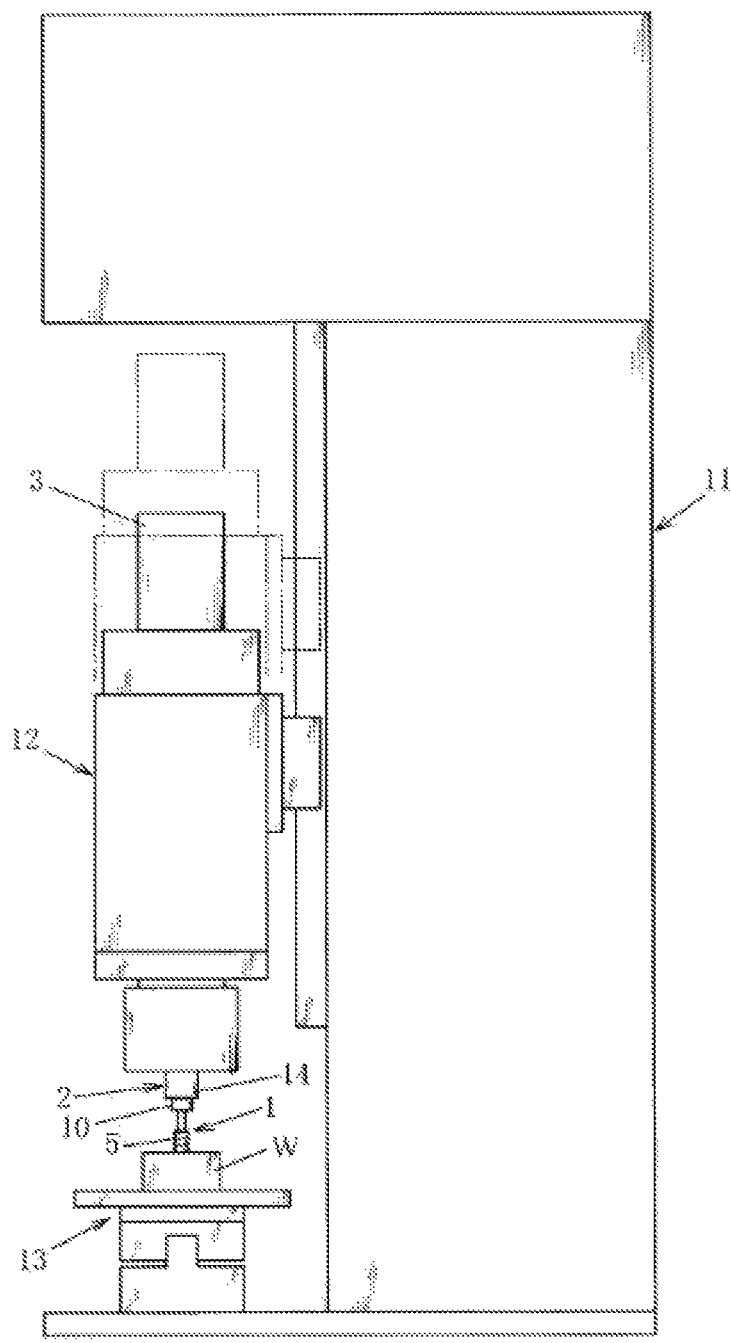
FIG. 1 is an explanatory side view showing example 1.

Preferred examples of the present invention are briefly described below with reference to the diagrams while indicating the effects of the present invention.

In an invention according to a first aspect, when a thread gauge 1 is mounted on a rotating-shaft portion 2, a phase-positioning portion 8 provided to a fastening portion 6 of the thread gauge 1 is engaged with a phase-positioning engaging portion 9 provided to the rotating-shaft portion 2 and the fastening portion 6 is fastened to the rotating-shaft portion 2, whereby the thread gauge 1 can be mounted on the rotating-shaft portion 2.

More specifically, the thread gauge 1 can be mounted on the rotating-shaft portion 2 only in a state in which the phase-positioning portion 8 and the phase-positioning engaging portion 9 are engaged. Configuring an orientation of the thread gauge 1 as a prescribed orientation so that the phase-positioning portion 8 engages with the phase-positioning engaging portion 9 and fastening the fastening portion 6 to the rotating-shaft portion 2 enables fastening of the fastening portion 6 to the rotating-shaft portion 2 and makes it possible to mount the thread gauge 1 on the rotating-shaft portion 2.

Due to the phase-positioning portion 8 and the phase-positioning engaging portion 9 being engaged and the thread gauge 1 being mounted on the rotating-shaft portion 2, the thread gauge 1 is mounted in a state in which rotation relative to the rotating-shaft portion 2 is prevented, and a tip-side start point 7 of a complete thread ridge formed on a gauge portion 5 of the thread gauge 1 is arranged at a prescribed phase position.

Specifically, even if the thread gauge 1 is replaced with a different thread gauge 1 that is then mounted on the rotating-shaft portion 2, a phase difference with respect to a thread-start position in a threaded hole 4 to be inspected is always fixed such that a tip-side start point 7 of a complete thread ridge of the newly mounted thread gauge 1 is arranged and placed at the same phase position as was the tip-side start point 7 of the complete thread ridge of the thread gauge 1 that was mounted before the replacement. Accordingly, for example, if the phase-positioning portion 8 and the phase-positioning engaging portion 9 are provided so that the tip-side start point 7 of the complete thread ridge is arranged at a position having a phase difference of 0° relative to the thread-start position in the threaded hole 4, a position of the tip-side start point 7 having been clarified by removing an incomplete thread ridge portion, then it will be possible to always have the position of the tip-side start point 7 of the complete thread ridge of the thread gauge 1 mounted on the rotating-shaft portion 2 be in the same phase as the thread-start position in the threaded hole 4 to be inspected.

Twisting of the gauge portion 5 of the thread gauge 1 into the threaded hole 4 is thereby started at the same time as the rotating-shaft portion 2 rotates due to rotation of the rotary drive portion 3 and the thread gauge 1 rotates due to rotation of the rotating-shaft portion 2. In addition, the gauge portion 5 does not enter a slip state of not being twisted (not being threaded) into the threaded hole 4 even when the thread gauge 1 rotates, an excessive number of rotations is not added when measurements are made of a depth of the threaded hole 4, the depth of the threaded hole 4 can be accurately measured, and inspection precision is improved.

Because the gauge portion 5 of the thread gauge 1 has no incomplete thread ridge portions, there is no risk of an incomplete thread ridge portion cutting into the threaded hole 4 when the thread gauge 1 is fully twisted (fully threaded) into the threaded hole 4. Therefore, it is possible to perform separation easily (smoothly) when the thread gauge 1 is to be separated from the threaded hole 4.

It is thus unnecessary for an operator to visually cause the tip-side start point 7 of the complete thread ridge to conform to the thread-start position in the threaded hole 4 to be inspected. Simply causing the phase-positioning portion 8 and the phase-positioning engaging portion 9 to engage and fastening the fastening portion 6 to the rotating-shaft portion 2 makes it possible to have the tip-side start point 7 of the complete thread ridge of the thread gauge 1 be in the same phase as the thread-start position in the threaded hole 4, measure the depth with high precision in such a manner as to exclude measurement error caused by a phase difference between the tip-side start point 7 of the complete thread ridge of the thread gauge 1 and the thread-start position in the threaded hole 4, and inspect the threaded hole with very high reliability, and an innovative threaded-hole inspection device is achieved which has exceptional utility and in which there are no adverse events involving cutting of a screw during twisting and separation.

In an invention according to a fifth aspect, a depth of a threaded hole 4 is measured by measuring (calculating) a distance over which a thread gauge 1 mounted on a rotating-shaft portion 2 advances (amount by which the thread gauge 1 is threaded in) during twisting of the thread gauge 1 into the threaded hole 4.

The distance over which the thread gauge 1 advances is established on the basis of: a distance over which the rotating-shaft portion 2 is fed, which is established from a number of rotations and thread pitch of a rotating-shaft-feeding mechanism 18 that, via threaded engagement, feeds the rotating-shaft portion 2; and a distance over which an outward-moving portion 23 moves outward from the threaded hole during twisting of the thread gauge 1 into the threaded hole 4. More specifically, the distance over which the thread gauge 1 advances is established by subtracting the distance over which the outward-moving portion 23 moves outward from the threaded hole from the distance over which the rotating-shaft portion 2 is fed, which is established by multiplying the number of rotations of a threaded part of the rotating-shaft-feeding mechanism 18 by the thread pitch of the threaded part of the rotating-shaft-feeding mechanism 18.

For example, in cases in which a thread pitch of the thread gauge 1 mounted on the rotating-shaft portion 2 is the same as the thread pitch of the rotating-shaft-feeding mechanism 18, and in which phase positions of the thread-start position in the threaded hole 4 and of a start point on a tip side of the complete thread ridge (referred to as a tip-side start point of the complete thread ridge) of the thread gauge match (have the same phase) in a state where the thread gauge 1 is placed into the threaded hole 4 to be inspected (referred to simply as a threaded hole 4 below) (e.g., a state where a tip portion of the thread gauge 1 is brought in contact with the threaded hole 4), twisting (threading) of the thread gauge 1 into the threaded hole 4 starts at the same time as rotation of the thread gauge 1 when the thread gauge 1 is twisted into the threaded hole 4, and the distance over which the rotating-shaft portion 2 fed by the rotating-shaft-feeding mechanism 18 is fed and the distance over which the thread gauge 1 advances are equal; i.e., there is no difference between said distances. Accordingly, the outward-moving portion 23 does not move outward from the threaded hole, and the distance over which the outward-moving portion 23 moves is zero. Therefore, the depth of the threaded hole 4 (distance over which the thread gauge 1 advances) is the amount of feeding of the rotating-shaft portion 2, i.e., a value obtained by multiplying together the number of rotations and the thread pitch of the threaded part of the rotating-shaft-feeding mechanism 18.

As another example, in cases in which the thread pitch of the thread gauge 1 mounted on the rotating-shaft portion 2 is the same as the thread pitch of the rotating-shaft-feeding mechanism 18, but there is a phase difference between the thread-start position in the threaded hole 4 and of the tip-side start point of the complete thread ridge of the thread gauge 1 in a state where the thread gauge 1 is placed into the threaded hole 4 to be inspected (referred to simply as a threaded hole 4 below) (e.g., a state where the tip portion of the thread gauge 1 is brought in contact with the threaded hole 4), even when rotation of the thread gauge is started when the thread gauge 1 is twisted into the threaded hole 4, the thread gauge 1 does not advance until the tip-side start point of the complete thread ridge of the thread gauge 1 reaches the thread-start position in the threaded hole 4 and twisting is started, and a difference is created between the distance over which the rotating-shaft portion 2 is fed and the distance over which the thread gauge 1 advances.

More specifically, a difference is created between the distance over which the rotating-shaft portion 2 is fed due to rotation of the threaded part of the rotating-shaft-feeding mechanism 18 and a phase difference created between the tip-side start point of the complete thread ridge of the thread gauge 1 and the thread-start position in the threaded hole 4. The outward-moving portion 23 moves outward from the threaded hole over a distance equivalent to the distance over which the rotating-shaft portion 2 is fed due to the rotation of the threaded part of the rotating-shaft-feeding mechanism 18 by an amount corresponding to the phase difference, and accounts for the difference between the distance over which the rotating-shaft portion 2 is fed and the distance over which the thread gauge 1 advances.

Conventionally, the distance over which the outward-moving portion 23 moves in order to account for the difference between the distance over which the rotating-shaft portion 2 is fed and the distance over which the thread gauge 1 advances equates to an amount of error in the depth of the threaded hole calculated solely on the basis of a number of thread rotations and thread pitch. A true depth of the threaded hole 4 can be established by subtracting the distance over which the outward-moving portion 23 moves for the amount of error from the distance over which the rotating-shaft portion 2 is fed.

Accordingly, the depth of the threaded hole 4 (distance over which the thread gauge 1 advances) is the amount of feeding of the rotating-shaft portion 2, i.e., a value established by subtracting the distance over which the outward-moving portion 23 moves outward from the threaded hole from a value obtained by multiplying together the number of rotations and the thread pitch of the threaded part of the rotating-shaft-feeding mechanism 18.

As another example, in cases in which the thread pitch of the thread gauge 1 mounted on the rotating-shaft portion 2 and the thread pitch of the rotating-shaft-feeding mechanism 18 are different, more specifically cases in which the thread pitch of the thread gauge 1 mounted on the rotating-shaft portion 2 is less (narrower) than the thread pitch of the rotating-shaft-feeding mechanism 18, a difference is created between the distance over which the rotating-shaft portion is fed and the distance over which the thread gauge 1 advances each time the threaded part of the rotating-shaft-feeding mechanism rotates once when the thread gauge 1 is twisted into the threaded hole 4. However, the outward-moving portion 23 moves outward from the threaded hole over a distance equivalent to a difference between the distance over which the rotating-shaft portion 2 is fed and the distance over which the thread gauge 1 advances, and accounts for the difference between the distance over which the rotating-shaft portion 2 is fed and the distance over which the thread gauge 1 advances. The depth of the threaded hole 4 (distance over which the thread gauge 1 advances) is therefore the distance over which the rotating-shaft portion 2 is fed, i.e., a value established by subtracting the distance over which the outward-moving portion 23 moves outward from the threaded hole from a value obtained by multiplying together the number of rotations and the thread pitch of the threaded part of the rotating-shaft-feeding mechanism 18, in the same manner as in cases in which a phase difference is created between the thread-start position in the threaded hole 4 and the tip-side start point of the complete thread ridge of the thread gauge 1 as described above.

Thus, even if there is a phase difference between the tip-side start point of the complete thread ridge of the thread gauge 1 mounted on the rotating-shaft portion 2 and the thread-start position in the threaded hole 4, it is possible to exclude measurement error produced due to the phase difference and accurately measure the depth of the threaded hole 4. Moreover, even if one thread gauge 1 is replaced with (exchanged for) a different thread gauge 1 having a different thread pitch, it is unnecessary to reset the thread pitch because the depth of the threaded hole 4 is measured on the basis of the number of rotations and thread pitch of the rotating-shaft-feeding mechanism 18. Accordingly, there is no risk of adverse inspection events occurring due to forgetting to reset the thread pitch or incorrectly resetting the thread pitch.

Specifically, there is achieved an innovative threaded-hole inspection device in which the depth of the threaded hole 4 can be accurately measured irrespective of whether there is a phase difference between the tip-side start point of the complete thread ridge of the thread gauge 1 mounted on the rotating-shaft portion 2 and the thread-start position in the threaded hole 4, and moreover in which it is unnecessary to reset the thread pitch even if one thread gauge 1 is replaced with (exchanged for) a different thread gauge 1 having a different thread pitch and with which there is no risk of adverse inspection events occurring due to forgetting to reset the thread pitch or incorrectly resetting the thread pitch.

Example 1

Figure 2:
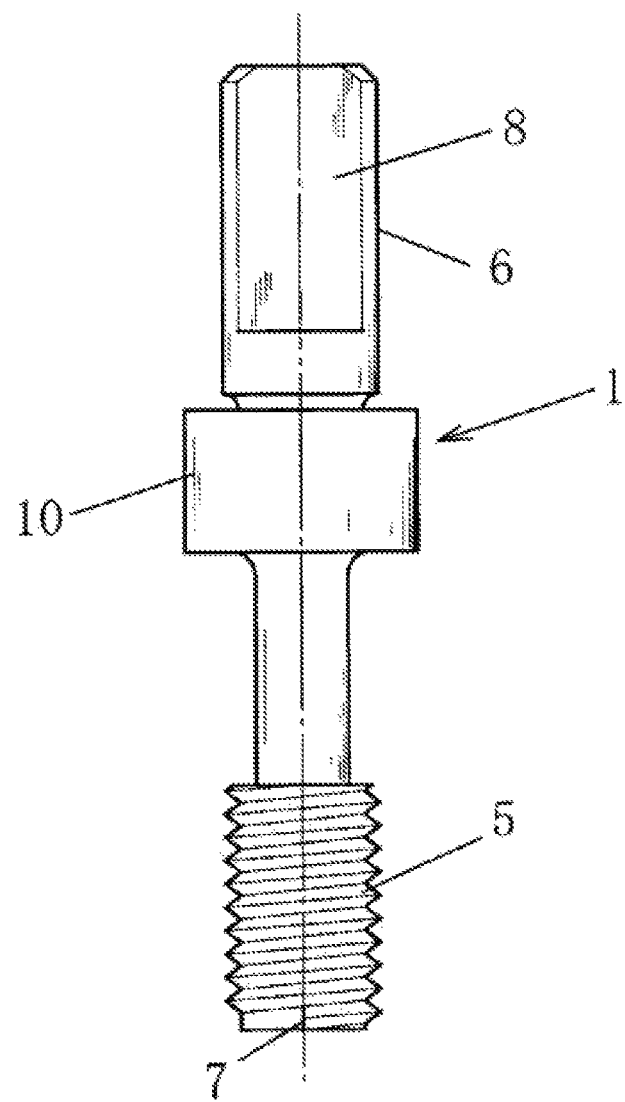
FIG. 2 is a front view showing a thread gauge of example 1.
Figure 3:
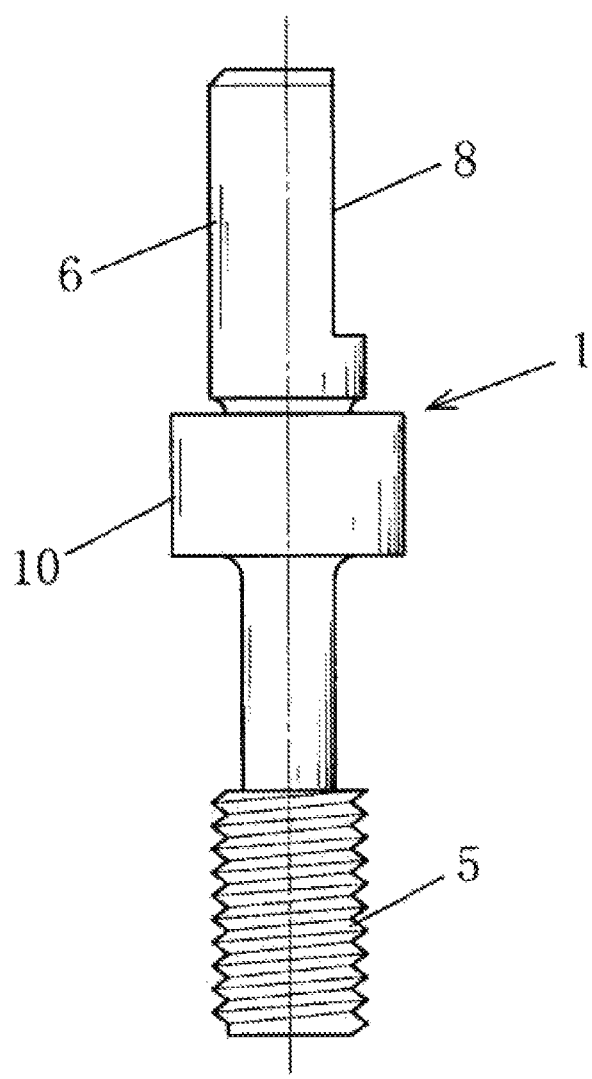
FIG. 3 is a side view showing the thread gauge of example 1.
Figure 4:
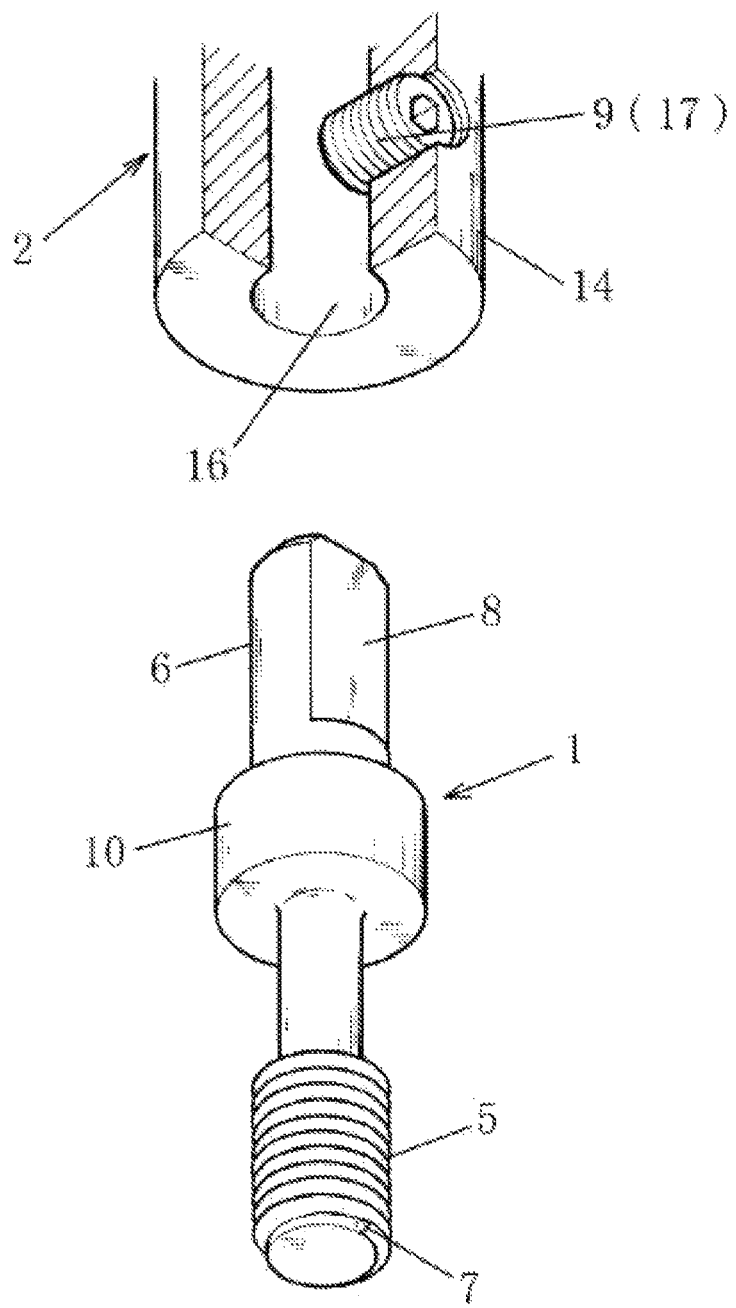
FIG. 4 is an explanatory drawing showing a circumstance in which the thread gauge of example 1 is mounted on a rotating-shaft portion.
Figure 5:
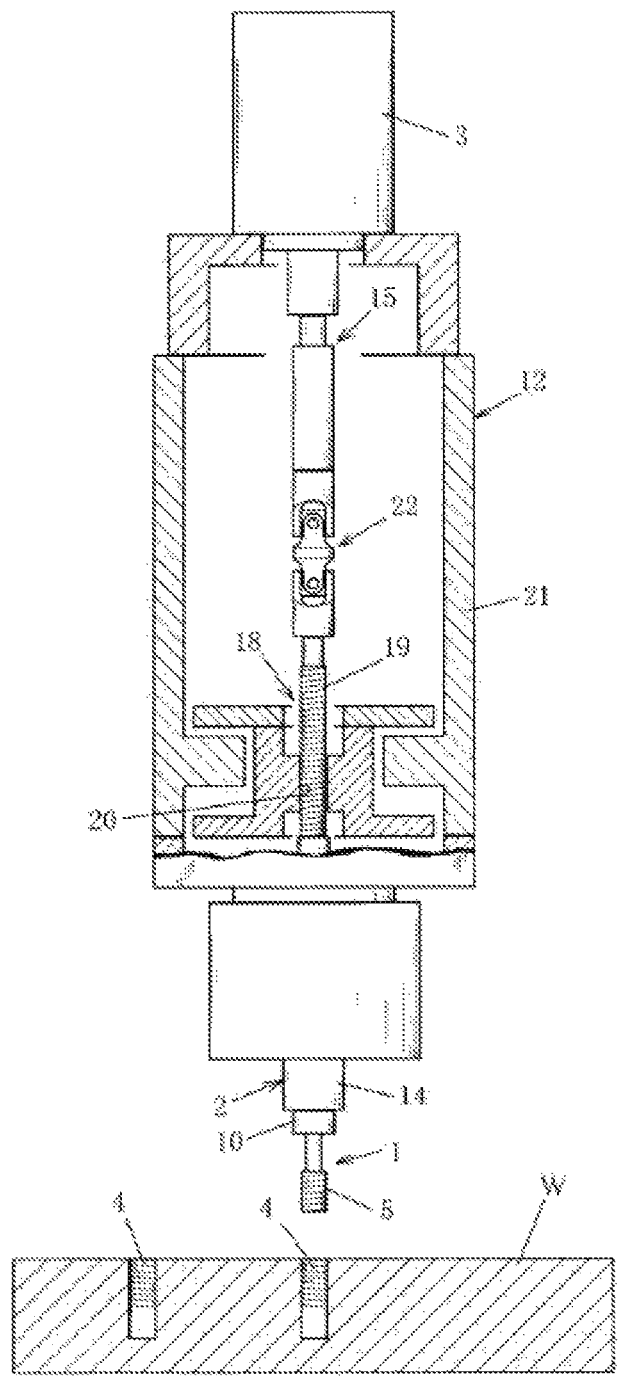
FIG. 5 is an explanatory cross-sectional view showing a usage state (state at initial position) of example 1.
Figure 6:
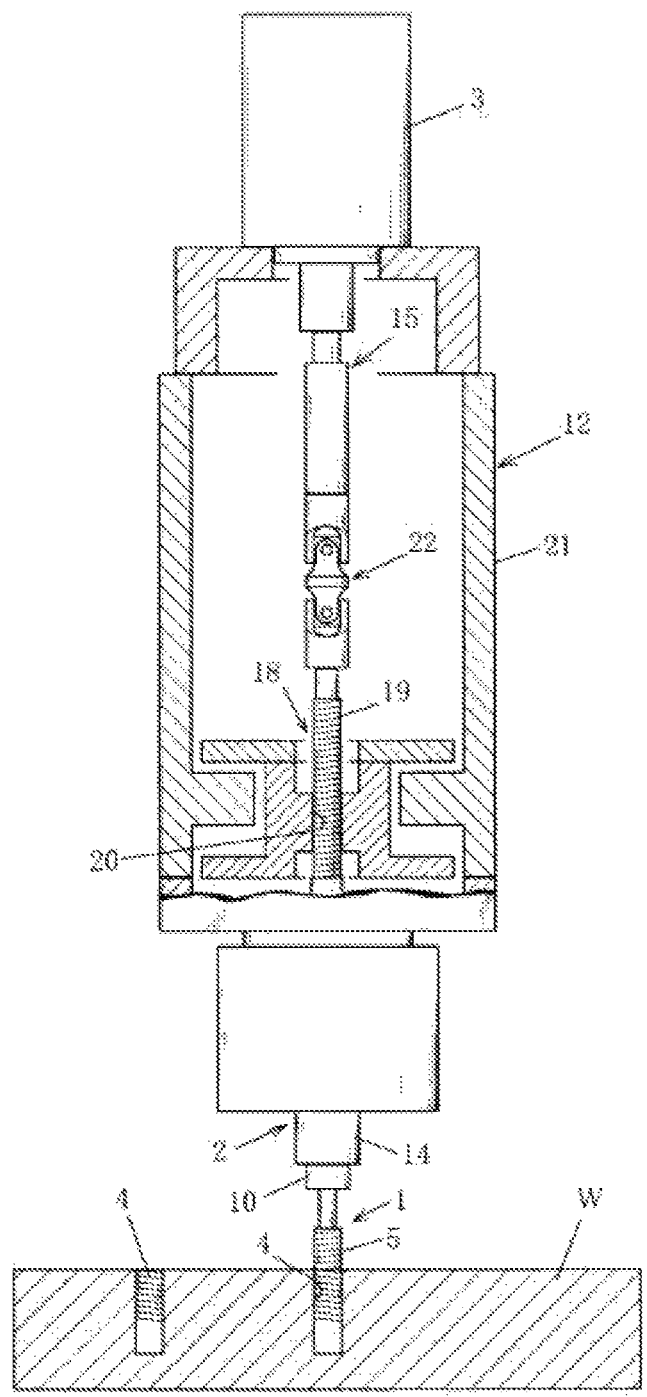
FIG. 6 is an explanatory cross-sectional view showing a usage state (state before twisting of thread gauge) of example 1.
Figure 7:
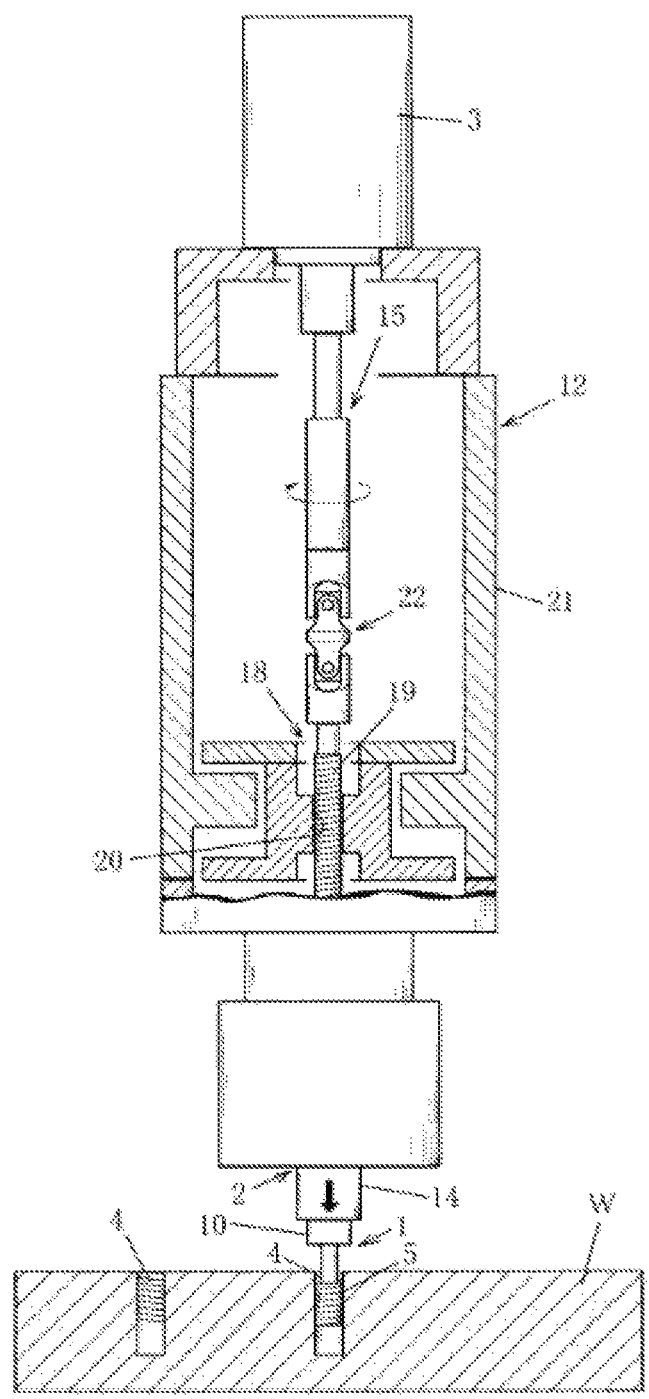
FIG. 7 is an explanatory cross-sectional view showing a usage state (state during twisting of thread gauge) of example 1.
Figure 8:
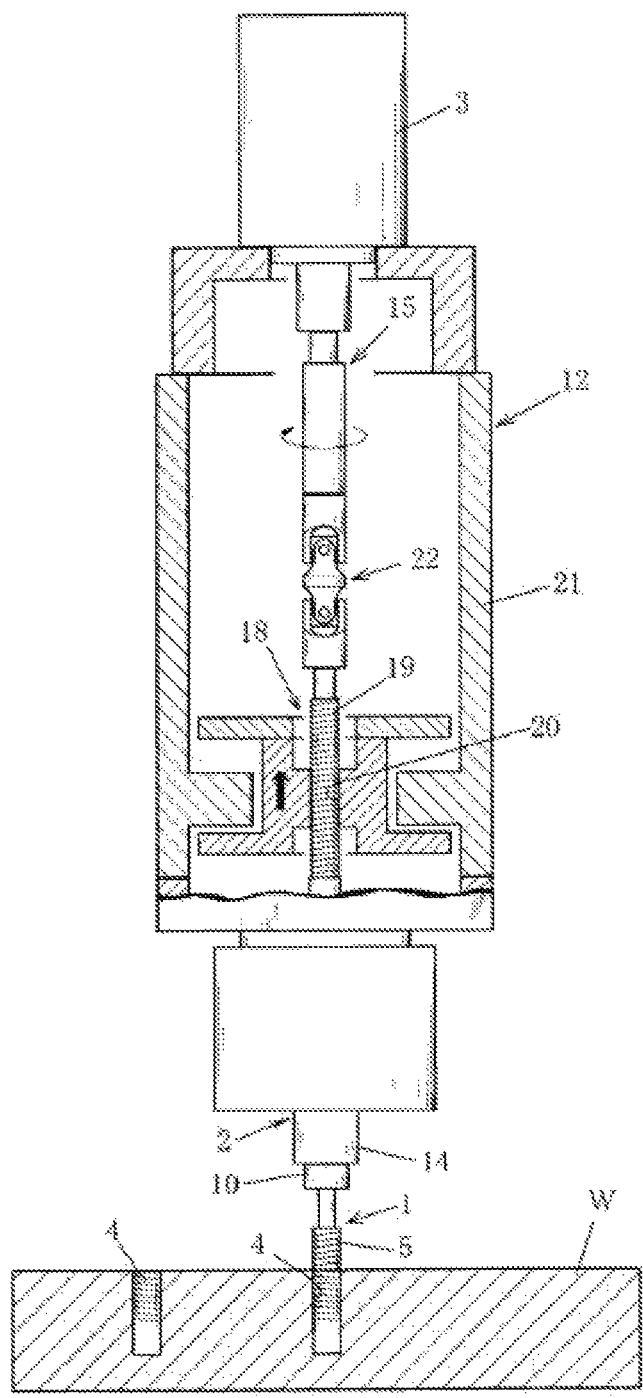
FIG. 8 is an explanatory cross-sectional view showing a usage state of example 1.
Figure 9:
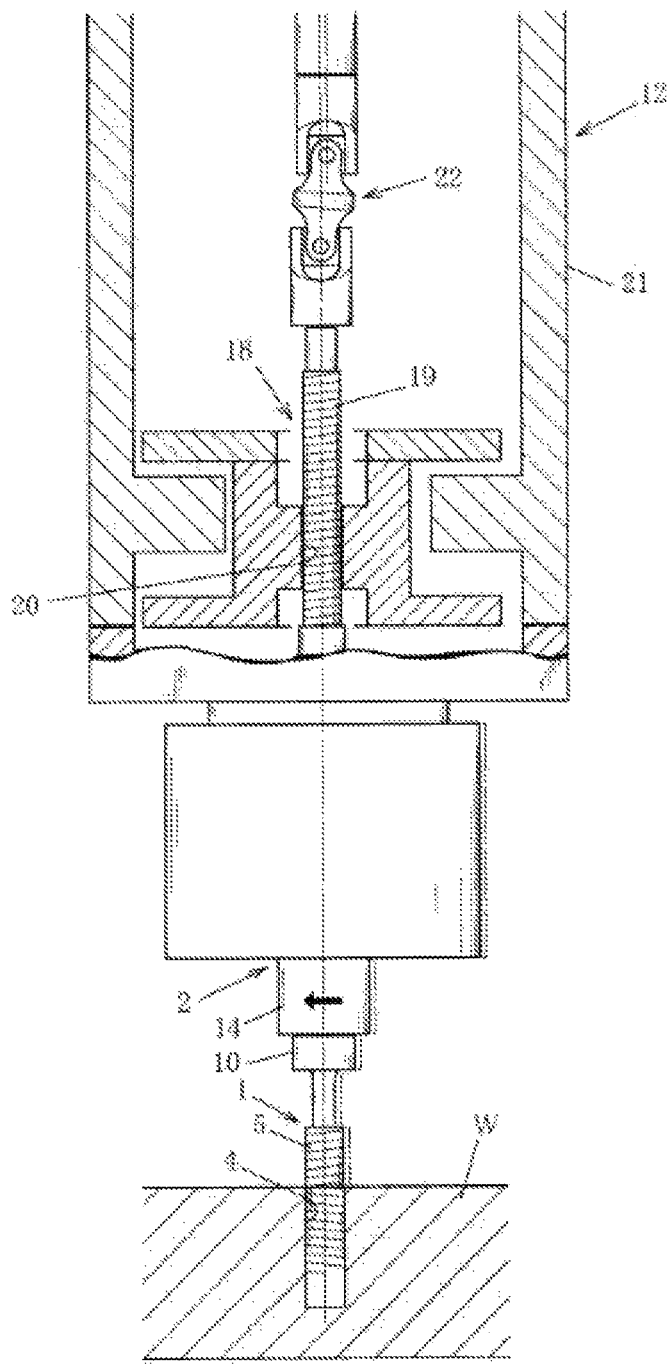
FIG. 9 is an explanatory cross-sectional view showing a usage state (state of action of an axial-deviation-permitting portion) of example 1.

A specific example 1 of the present invention is described on the basis of FIG. 1-9.

The present example is a threaded-hole inspection device equipped with a thread gauge 1, a rotating-shaft portion 2 on which the thread gauge 1 is detachably mounted, and a rotary drive portion 3 that rotates the rotating-shaft portion 2 to rotate the thread gauge 1 mounted on the rotating-shaft portion 2, the threaded-hole inspection device being configured so that: the thread gauge 1 is twisted into a threaded hole 4 to be inspected (referred to simply as a threaded hole 4 below); a depth dimension of the threaded hole 4 is measured on the basis of a number of rotations from when twisting of the thread gauge 1 into the threaded hole 4 starts until the twisting is complete, and on the basis of a thread pitch of the thread gauge 1; and the depth dimension of the threaded hole 4 is inspected.

More specifically, the threaded-hole inspection device of the present example is configured from a device base body portion 11, a moving inspection portion 12 provided to the device base body portion so as to be capable of moving vertically, and a workpiece placement platform portion 13 for placing a workpiece W in which the threaded hole 4 is formed. The moving inspection portion 12 is caused to approach and descend into the threaded hole 4 machined into the workpiece W that is placed on the workpiece placement platform portion 13, and a tip portion of the thread gauge 1 provided to the moving inspection portion 12 is brought in contact with the threaded hole 4. The rotary drive portion 3 is driven in a state in which the thread gauge 1 is in contact with the threaded hole 4, and the thread gauge 1 is rotated and progressively twisted into the threaded hole 4. An amount of twisting of the thread gauge 1 into the threaded hole 4, i.e., a depth of the threaded hole 4 is measured (calculated) from a number of rotations and thread pitch during twisting of the thread gauge 1 into the threaded hole 4. It is determined on the basis of the measured result whether an inspection pertaining to the depth of the threaded hole 4 is satisfactory.

The present example is described in further detail below.

The thread gauge 1 of the present example is configured so that a gauge portion 5 to be twisted into the threaded hole 4 is provided to a tip portion of the thread gauge 1, and a fastening portion 6 that fastens to the rotating-shaft portion 2 is provided to a base portion of the thread gauge 1.

More specifically, the gauge portion 5 is configured so that an incomplete thread ridge portion produced on a tip portion of the gauge portion 5 during formation of a thread (external thread) is removed, and a start point on a tip side of a complete thread ridge portion (referred to as a tip-side start point 7 of a complete thread ridge below) is clarified.

The fastening portion 6 is configured so that a phase-positioning portion 8 is provided thereto, the phase-positioning portion 8 positioning the tip-side start point 7 of the complete thread ridge portion of the gauge portion 5 at a prescribed phase when the thread gauge 1 is mounted on the rotating-shaft portion 2.

More specifically, the fastening portion 6 is shaped as a round rod, and the phase-positioning portion 8 is provided at a prescribed position on a surface of the round-rod-shaped fastening portion 6 with reference to the tip-side start point 7 of the complete thread ridge of the gauge portion 5 described above. In the present example, the phase-positioning portion 8 is configured to be provided at a position having the same phase as the tip-side start point 7 of the complete thread ridge (a position at which a phase difference is 0°), i.e., is provided on an axial extension of the tip-side start point 7 of the complete thread ridge.

Even more specifically, in the present example, a surface portion of the fastening portion 6 shaped as a round rod is notched to form a flat surface portion (D-cut), said surface portion being positioned on an extension of the tip-side start point 7 of the complete thread ridge, and the flat surface portion formed on the fastening portion 6 is set as the phase-positioning portion 8. The phase-positioning portion 8 may be configured as a key or a keyway of a keyway engaging structure.

The thread gauge 1 of the present example is configured to be provided with a contacting engaging portion 10 that comes into contact and engages with the rotating-shaft portion 2 when the fastening portion 6 is inserted and mounted, or fitted and mounted, into the rotating-shaft portion 2.

More specifically, the contacting engaging portion 10 is shaped as a flange having a greater diameter than does the fastening portion 6, and is configured to be provided in a state of being linked to a gauge-portion-side end portion of the fastening portion 6. In the present example, the flange-shaped contacting engaging portion 10 is configured to come into contact with a tip portion of the rotating-shaft portion 2 when the fastening portion 6 is inserted into the rotating-shaft portion 2, thereby restricting insertion of the fastening portion 6 into the rotating-shaft portion 2.

Specifically, in the present example, inserting the fastening portion 6 into the rotating-shaft portion 2 until the contacting engaging portion 10 comes into contact and engages with the rotating-shaft portion 2 when mounting the thread gauge 1 on the rotating-shaft portion 2 fixes an amount of insertion of the fastening portion 6 into the rotating-shaft portion 2. A configuration is thereby adopted in which an amount of protrusion of the thread gauge 1 mounted on the rotating-shaft portion 2 is fixed.

The rotating-shaft portion 2, on which the thread gauge 1 is detachably mounted, is configured so that: a thread gauge insertion fastening portion 14 is provided to the tip portion of the rotating-shaft portion 2, the thread gauge insertion fastening portion 14 inserting and fastening the fastening portion 6 into the thread gauge 1; and a rotating shaft telescoping operation portion 15 is provided to a base portion of the rotating-shaft portion, the rotating shaft telescoping operation portion 15 being linked to the rotary drive portion 3 and causing the rotating-shaft portion 2 to perform a telescoping operation.

More specifically, the thread gauge insertion fastening portion 14 is shaped as a circular column, and is configured to be provided with a phase-positioning engaging portion 9 in which a thread gauge insertion fastening hole 16 is formed along a central axis of the phase-positioning engaging portion 9, the fastening portion 6 of the thread gauge 1 being inserted and fastened into the thread gauge insertion fastening hole 16, and the phase-positioning engaging portion 9 engaging with the phase-positioning portion 8 provided to the fastening portion 6 inserted into the thread gauge insertion fastening hole 16.

In the present example, a gauge-securing member, more specifically a gauge-securing screw 17 (a set screw is employed in the present example) for inseparably securing the fastening portion 6 inserted and fastened into the thread gauge insertion fastening hole 16, is set as the phase-positioning engaging portion 9.

Specifically, the present example is configured so that a threaded hole passing through the thread gauge insertion fastening hole 16 is formed on a peripheral surface of the thread gauge insertion fastening portion 14, and a tip portion of the gauge-securing screw 17 is made to protrude into the thread gauge insertion fastening hole 16 and twisted in the threaded hole, whereby the tip portion of the gauge-securing screw 17 that protrudes into the thread gauge insertion fastening hole 16 serves as the phase-positioning engaging portion 9, and the thread gauge 1 can be mounted so as to be positioned in a state in which rotation relative to the rotating-shaft portion 2 is prevented due to concavo-convex engagement between the phase-positioning engaging portion 9 (convex portion) and the phase-positioning portion 8 (concave portion), which is formed as a D-cut.

The rotating shaft telescoping operation portion 15 is configured to be composed of a spline structure, and more specifically is configured to be composed of a spline shaft portion (not shown) and a spline bearing portion (not shown).

Even more specifically, in the present example, the spline shaft portion is linked to the rotary drive portion 3 and transmits rotational driving from the rotary drive portion 3 to the rotating-shaft portion 2. Due to movement of the spline bearing portion in an axial direction in relation to the spline shaft portion, the rotating-shaft portion 2 rotates so as to be capable of telescoping.

The rotating-shaft portion 2 of the present example is configured to be fed, due to the rotating-shaft-feeding mechanism 18, in a threaded-hole-approaching direction, which is a direction of approach toward the threaded hole 4 to be inspected. Specifically, the rotating-shaft portion 2 is configured so that the rotating shaft telescoping operation portion 15 extends commensurately with the feeding by the rotating-shaft-feeding mechanism 18.

More specifically, the rotating-shaft-feeding mechanism 18 is configured to feed the rotating-shaft portion 2 by threading. Even more specifically, the rotating-shaft-feeding mechanism 18 is configured to be composed of a threaded part 19 provided to the rotating-shaft portion 2, and a nut 20 that is threaded onto the threaded part 19. The rotating-shaft-feeding mechanism 18 is configured so that the threaded portion 19 provided to the rotating-shaft portion 2 is fed by being progressively threaded into the nut 20 due to the rotating-shaft portion 2 rotating forward (clockwise) via forward rotational driving from the rotary drive portion 3, and so that the rotating-shaft portion 2 is fed outward from the threaded hole in a direction opposite to that of a feed direction due to the rotating-shaft portion 2 rotating backward (counter-clockwise) via backward rotational driving from the rotary drive portion 3.

The present example is configured so that an initial position (zero position) of the rotating-shaft portion 2, more specifically an initial phase position of the phase-positioning engaging portion 9 of the thread gauge insertion fastening portion 14 provided to the tip portion of the rotating-shaft portion 2, is fixed due to the rotating-shaft-feeding mechanism 18, which is composed of the threaded part 19 and the nut 20, and the rotating shaft telescoping operation portion 15, which is composed of the spline shaft portion and the spline bearing portion described above.

Specifically, in the present example, the initial position of the rotating-shaft portion 2 is set in a state in which the rotating shaft telescoping operation portion 15 is furthest retracted, i.e., a state in which a tip portion of the spline shaft portion and a bottom portion of the spline bearing portion are in contact. A configuration is thereby adopted in which, after the rotating shaft 2 has been rotated due to forward rotational driving from the rotary drive portion 3 and the thread gauge 1 (gauge portion 5) has been twisted into the threaded hole 4, when the thread gauge 1 is separated from the threaded hole 4 due to backward rotational driving from the rotary drive portion 3 and the rotating-shaft portion 2 returns to the initial position: the rotating-shaft portion 2 is fed outward from the threaded hole in a direction opposite to that of the feed direction, until the tip portion of the spline shaft portion and the bottom portion of the spline bearing portion come into contact with each other; retraction of the rotating shaft telescoping operation portion 15 is restricted (suppressed) due to the contact between the tip portion of the spline shaft portion and the bottom portion of the spline bearing portion; rotation of the rotating-shaft portion 2 is restricted (suppressed) due to the restriction of retraction; and a height position of the rotating-shaft portion 2 in an initial state is fixed, and the phase position of the rotating-shaft portion 2, more specifically the phase position of the phase-positioning engaging portion 9 of the thread gauge insertion fastening portion 14 provided to the rotating-shaft portion 2, is positioned at a prescribed phase position. A position rotated in forward (in a spline extension direction) at a preset number of rotations from the initial position may be set as the initial state.

More specifically, the present example is configured so that the phase position of the phase-positioning engaging portion 9 of the thread gauge insertion fastening portion 14 in the initial state of the rotating-shaft portion 2 matches (has the same phase as) the thread-start position in the threaded hole 4 machined into the workpiece W that is placed on the workpiece placement platform portion 13. The present example is thereby configured so that when the thread gauge 1 is mounted on the rotating-shaft portion 2, more specifically on the thread gauge insertion fastening portion 14 of the rotating-shaft portion 2, the tip-side start point 7 of the complete thread ridge of the gauge portion 5 of the thread gauge 1 always matches (has the same phase as) the thread-start position in the threaded hole 4 machined into the workpiece W that is placed on the workpiece placement platform portion 13.

The nut 20 of the present example is configured to be provided to a moving-housing portion 21 in a non-secured state (floating structure), the rotating-shaft portion 2 being provided to the moving-housing portion 21 so as to be capable of relative movement.

More specifically, the nut 20 of the present example is configured to be provided in a state in which rotation relative to the moving-housing portion 21 is prevented due to a rotation-preventing guide portion (not shown), and also provided so as to be capable of moving vertically relative to the moving-housing portion 21 along the rotation-preventing guide portion (the nut being guided thereby). Furthermore, the nut 20 of the present example is positioned at and urged toward a prescribed position by positioning urging means (not shown) (a spring member is employed in the present example), and more specifically is positioned at and urged toward a position at which the nut is in contact with and supported by a retaining support portion (not shown) provided to a lower end of the rotation-preventing guide portion.

Specifically, in the present example, the threaded part 19 provided to the rotating-shaft portion 2 is threaded into the nut 20 that is provided to the moving-housing portion 21 so as to be capable of moving vertically (floating structure), and the rotating-shaft portion 2 rotates due to rotational driving from the rotary drive portion 3, whereby the threaded part 19 is progressively threaded into the nut 20 and the rotating-shaft portion 2 is fed in the threaded-hole-approaching direction in relation to the nut 20 positioned by the positioning urging means. When a situation occurs in which twisting of the thread gauge 1 into the threaded hole 4 does not advance relative to feeding of the rotating-shaft portion 2 due to, for example, an adverse effect in formation of the threaded hole 4, the nut 20 resists an urging force of the positioning urging means and moves outward from the threaded hole (upward in the present example) in a direction opposite to that of the feed direction of the rotating-shaft portion 2, in accordance with the distance over which the threaded part 19 is fed (amount by which the threaded part 19 is threaded in), and forward advancement of the rotating-shaft portion 2 is restricted due to the nut 20 moving outward from the threaded hole, reducing a load applied to the thread gauge 1.

The present example is configured to have threaded-hole-fault-sensing means (not shown) for sensing faults in the formation of the threaded hole in situations in which the thread gauge 1 is not twisted into the threaded hole 4 even when the rotating-shaft portion 2 is rotating due to rotational driving from the rotary drive portion 3 and twisting of the thread gauge 1 into the threaded hole 4 is started due to rotation of the rotating-shaft portion 2, i.e., in cases in which a fault has occurred in the formation of the threaded hole.

More specifically, the present example is configured to have a touch sensor as the threaded-hole-fault-sensing means. The touch sensor is configured to be provided at a position set apart from the nut 20 by a prescribed gap, more specifically a position that is in contact in cases in which twisting of the thread gauge 1 into the threaded hole 4 does not advance relative to feeding of the rotating shaft portion 2 due to, inter alia, an adverse effect in the formation of the threaded hole 4, and in which the nut 20 moves at least a prescribed distance outward from the threaded hole. The touch sensor is moreover configured so that a switch for a signal indicating that a fault has been sensed upon the nut 20 having moved and contacted the touch sensor (e.g., a signal for stopping the rotary drive portion 3 or a signal that reports a fault) is on. The threaded-hole-fault-sensing means is not limited to being a touch sensor; any means can be suitably employed, provided that it is possible to sense that the nut 20 has moved by at least a prescribed value.

Furthermore, the rotating-shaft portion 2 of the present example is configured to be provided with an axial-deviation-permitting portion 22 that permits eccentricity, declination, and other such forms of axial deviation of the rotating-shaft portion 2.

More specifically, the rotating-shaft portion 2 of the present example is configured so that a double-type universal joint 22 that is the axial-deviation-permitting portion 22 is provided partway along a length direction (more specifically, between the rotating shaft telescoping operation portion 15 and the threaded part 19) of the rotating-shaft portion 2. Even when, for example, there is a slight positional deviation between a center axis of the thread gauge 1 and a center axis of the threaded hole 4, the thread gauge 1 mounted on the tip portion of the rotating-shaft portion 2, more specifically on the thread gauge insertion fastening portion 14 of the rotating-shaft portion 2, positionally deviates (moves horizontally) due to the axial-deviation-permitting portion 22 (universal joint 22) so as to be threaded into the threaded hole 4 and is threaded into the threaded hole 4, and it is possible to perform a rotation operation and to twist the thread gauge 1 into the threaded hole 4 while there remains an eccentric state in which the center axis of the thread gauge 1 threaded into the threaded hole 4 positionally deviates from a center axis of a rotating shaft of the rotary drive portion 3.

The present example is configured to have a threaded-hole-depth-measuring unit (not shown) that measures the depth of the threaded hole 4.

More specifically, the threaded-hole-depth-measuring unit of the present example is configured to measure the threaded hole 4 on the basis of the number of rotations of the threaded part 19 constituting part of the rotating-shaft-feeding mechanism 18 described above, i.e., the number of rotations of the rotating-shaft portion 2, and on the basis of the thread pitch of the threaded part 19. The number of rotations used is not limited to that described above; the number of rotations made by the rotary drive portion 3 or the number of rotations made by the thread gauge 1 may be used. In addition, the thread pitch of the gauge portion 5 of the thread gauge 1 may be used as the thread pitch.

The operation and effect of the threaded-hole inspection device of the present example configured as described above is described below.

When the thread gauge 1 is mounted on the rotating-shaft portion 2, the phase-positioning portion 8 provided to the fastening portion 6 of the thread gauge 1 is engaged with the phase-positioning engaging portion 9 of the thread gauge insertion fastening portion 14 provided to the tip portion of the rotating-shaft portion 2, and the fastening portion 6 of the thread gauge 1 is inserted and fastened into the thread gauge insertion fastening portion 14 of the rotating-shaft portion 2, whereby mounting is achieved in a state in which the tip-side start point 7 of the complete thread ridge of the gauge portion 5 of the thread gauge 1 is positioned so as to have the same phase as the thread-start position in the threaded hole 4 machined into the workpiece W that is placed on the workpiece placement platform portion 13.

Therefore, when the thread gauge 1 is mounted on the rotating-shaft portion 2, the moving inspection portion 12 is moved downward, and the gauge portion 5 of the thread gauge 1 comes into contact with the threaded hole 4, a state is achieved in which the tip-side start point 7 of the complete thread ridge of the gauge portion 5 matches the thread-start position in the threaded hole 4. Actuating the rotary drive portion 3 in a state in which the tip-side start point 7 of the complete thread ridge of the thread gauge 1 and the thread-start position in the threaded hole 4 match causes the thread gauge 1 (the gauge portion 5 of the thread gauge 1) to immediately mesh with and be progressively twisted into the threaded hole 4.

This eliminates a non-biting state (a slip state of not being twisted into the threaded hole 4 even when the thread gauge 1 rotates) caused by a phase difference as in the past and improves measurement precision in measuring the depth of the threaded hole 4 on the basis of the number of rotations and the thread pitch.

Because the present example is configured so that the gauge portion 5 of the thread gauge 1 has no incomplete thread ridge portions, the risk of an incomplete thread ridge portion cutting into the threaded hole 4 when the thread gauge 1 is fully twisted (fully threaded) into the threaded hole 4 is reduced as much as possible. This makes it possible to perform separation easily (smoothly) when the thread gauge 1 is to be separated from the threaded hole 4.

Furthermore, because the present example is configured to have the threaded-hole-fault-sensing means, the threaded-hole-fault-sensing means can sense a fault when there is an adverse effect in the threaded hole 4 and the thread gauge 1 is not twisted, and can stop the twisting operation of the thread gauge 1 and reduce (mitigate) the load applied to the thread gauge 1.

Furthermore, because the present example is configured so that the axial-deviation-permitting portion 22 is provided to the rotating-shaft portion 2, even when there is some positional deviation between the center axis of the gauge portion 5 of the thread gauge 1 and the center axis of the threaded hole 4 when the moving inspection portion 12 is moved downward and the gauge portion 5 of the thread gauge 1 is placed in the threaded hole 4, the thread gauge 1 (rotating-shaft portion 2) moves horizontally due to the axial-deviation-permitting portion 22 so that the center axis of the gauge portion 5 and the center axis of the threaded hole 4 match, and the positional deviation is accounted for. Therefore, even if inspection is stopped and positional conformance is not reset, it is possible to then continue inspection, improving workability.

Thus, the present example is an innovative threaded-hole inspection device with which it is possible to measure the depth of a threaded hole with high precision and to inspect threaded holes in a very highly reliably manner, and which has enhanced user-friendliness and exceptional utility.

Example 2

Figure 10:
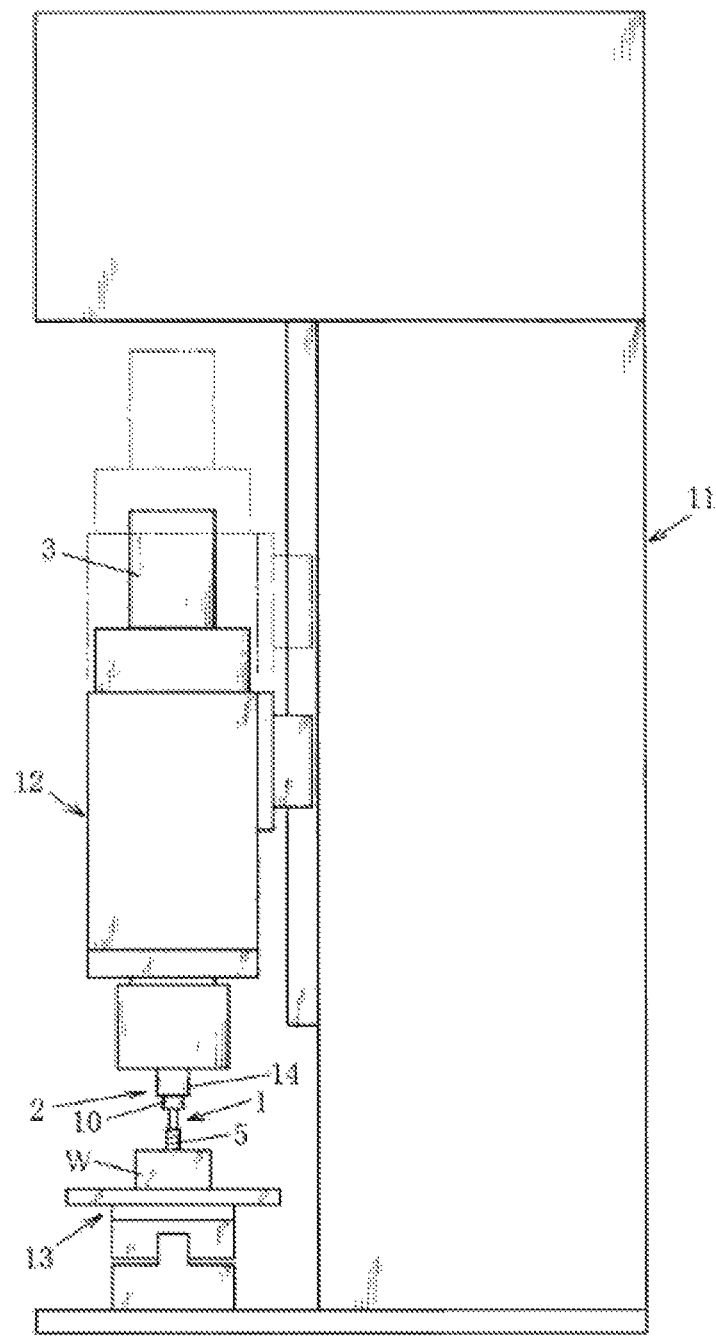
FIG. 10 is an explanatory side view showing example 2.
Figure 11:
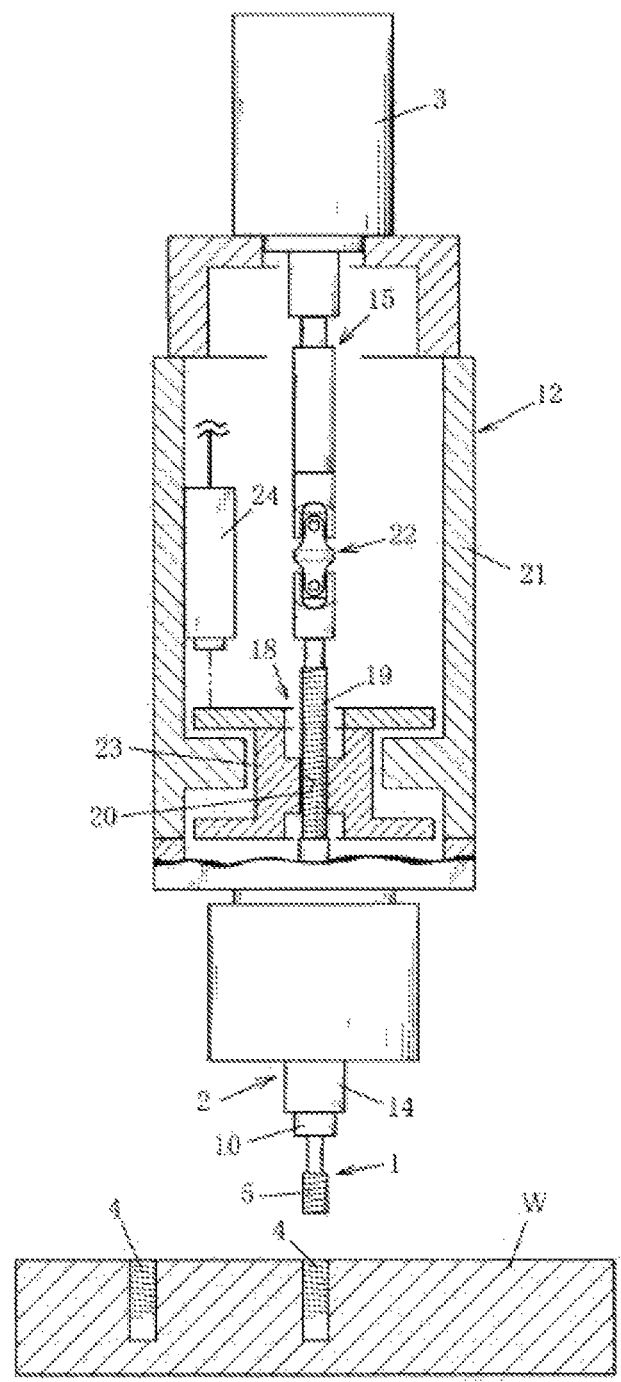
FIG. 11 is an explanatory cross-sectional view showing a usage state (state at initial position) of example 2.
Figure 12:
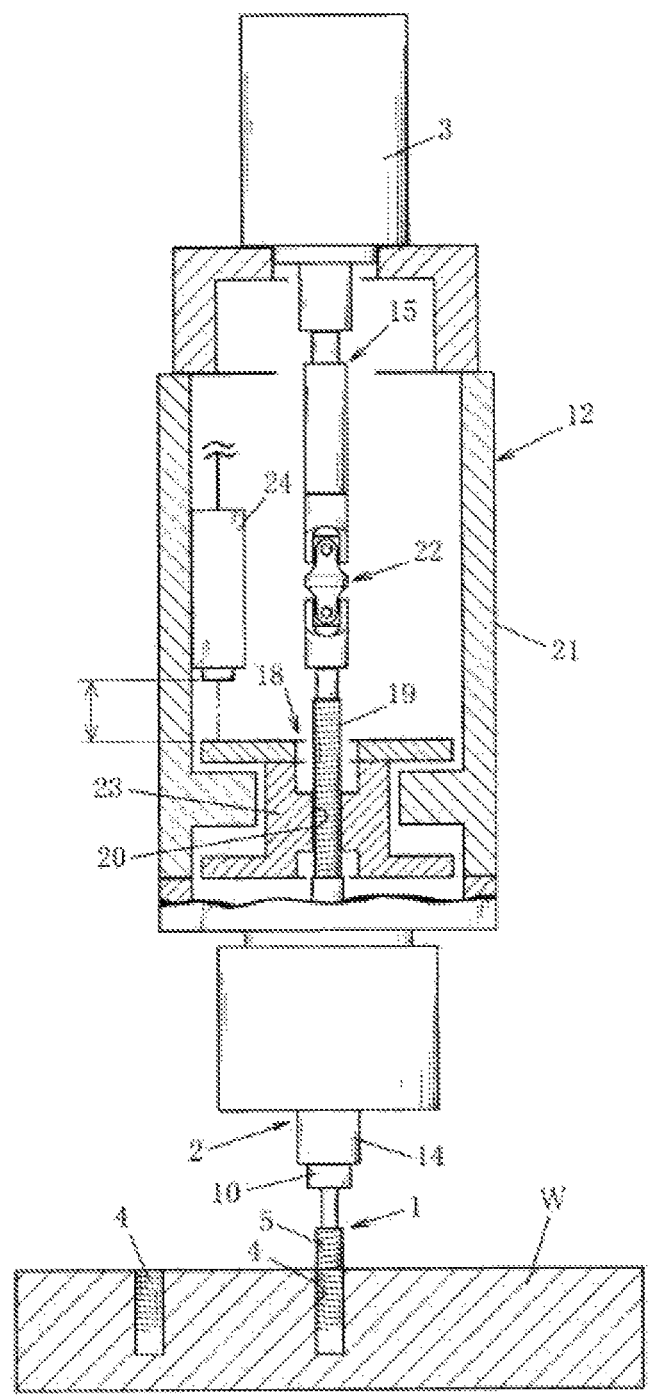
FIG. 12 is an explanatory cross-sectional view showing a usage state (state at start of inspection of threaded hole) of example 2.
Figure 13:
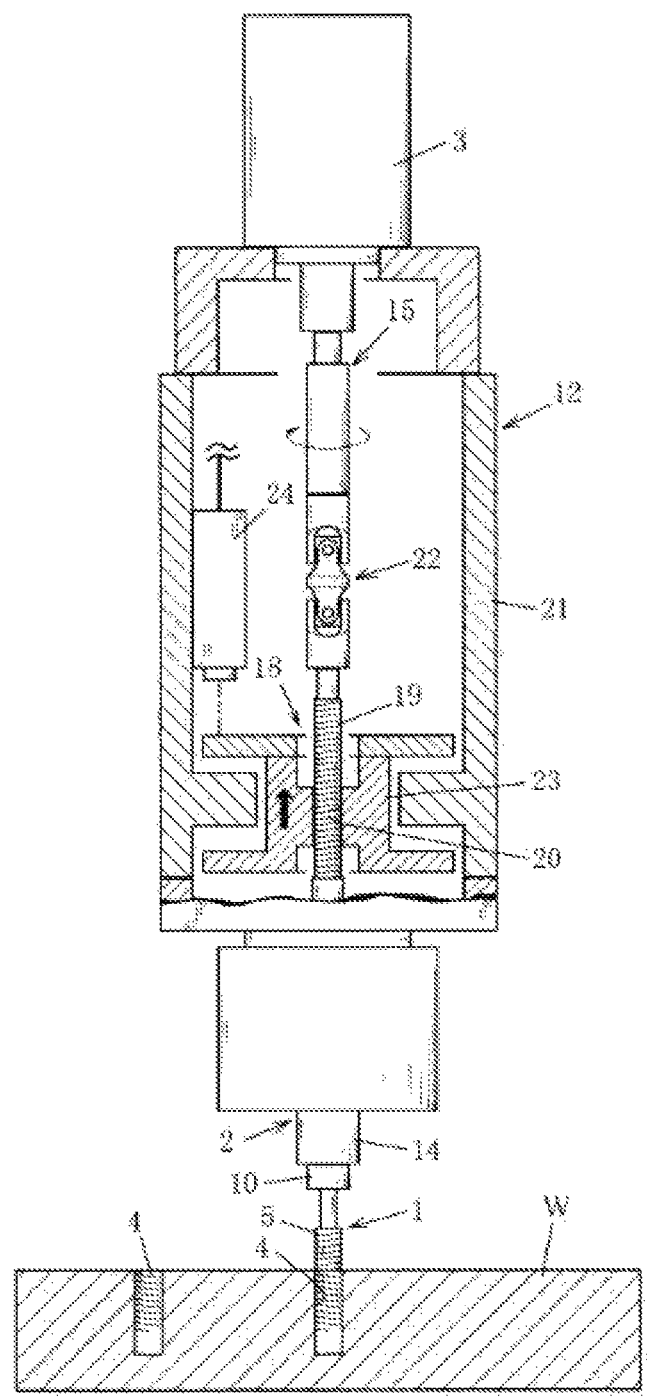
FIG. 13 is an explanatory cross-sectional view showing a usage state (state of action of an outward-moving portion) of example 2.
Figure 14:
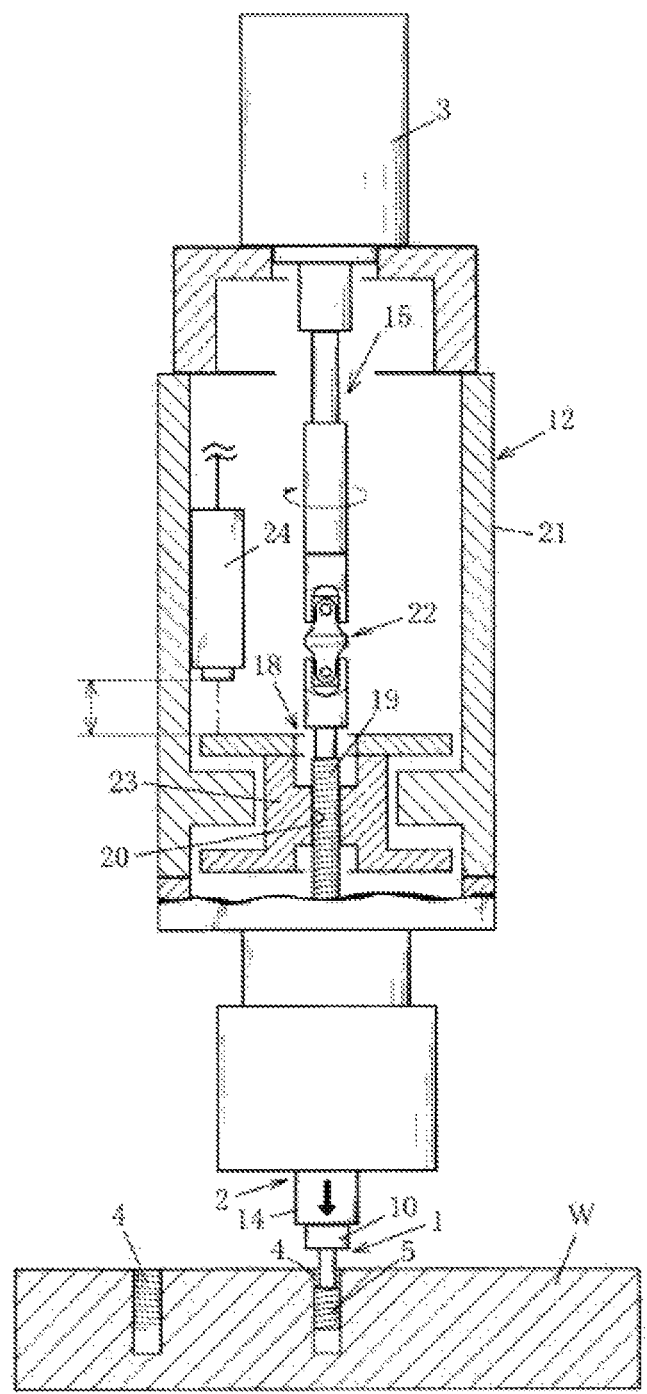
FIG. 14 is an explanatory cross-sectional view showing a usage state (state where thread gauge is twisted) of example 2.
Figure 15:
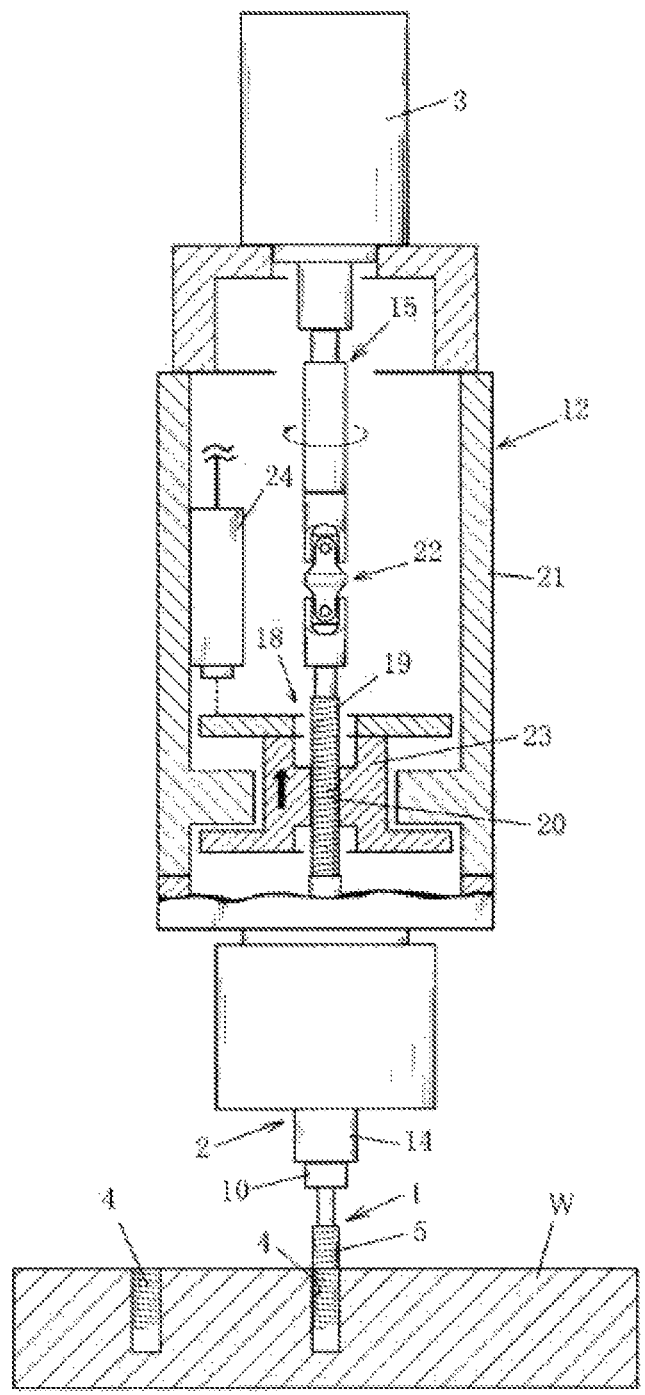
FIG. 15 is an explanatory cross-sectional view showing a usage state of example 2.
Figure 16:
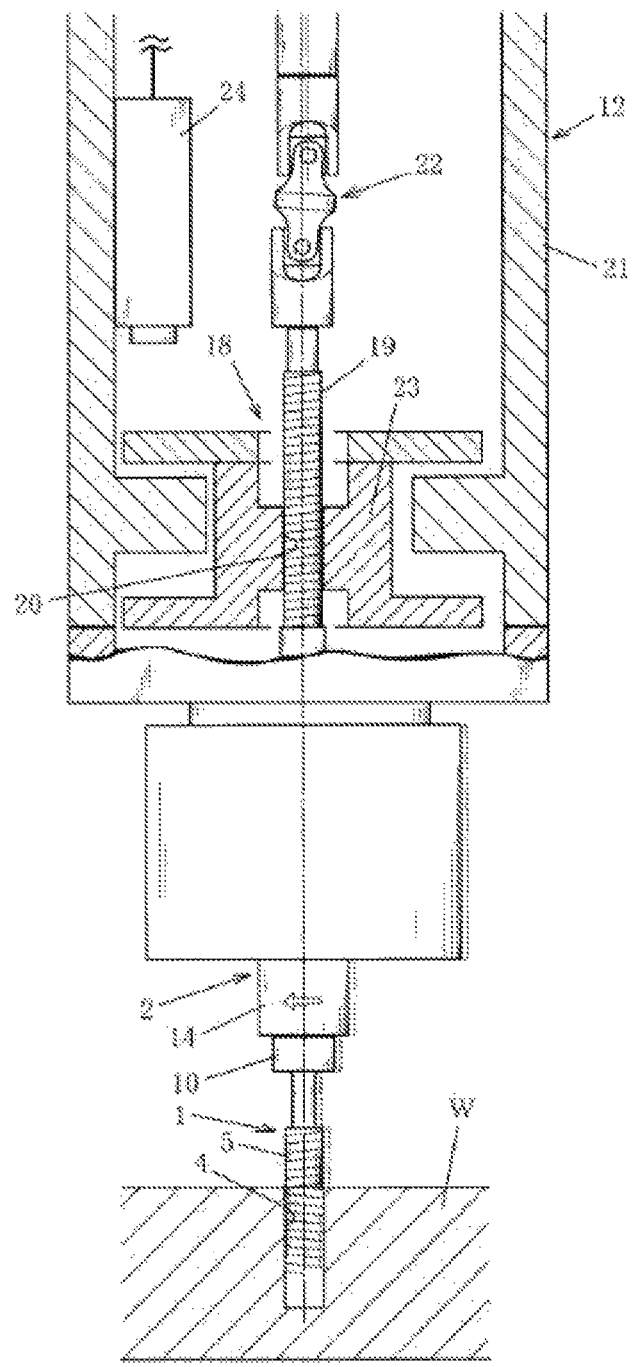
FIG. 16 is an explanatory cross-sectional view showing a usage state (state of action of an axial-deviation-permitting portion) of example 2.

A specific example 2 of the present invention is described on the basis of FIG. 10-16.

The present example is a threaded-hole inspection device having: a thread gauge 1; a rotating-shaft portion 2 on which the thread gauge 1 is detachably mounted; a rotary drive portion 3 that rotates the rotating-shaft portion 2 to rotate the thread gauge 1 mounted on the rotating-shaft portion 2; a rotating-shaft-feeding mechanism 18 that, via threaded engagement, feeds the rotating-shaft portion 2 rotating due to the rotary shaft portion 3, the rotating-shaft portion 2 being fed in a threaded-hole-approaching direction, which is a direction of approach toward a threaded hole 4 to be inspected; and an outward-moving portion 23 configured so that, when a difference is created between the distance over which the rotating-shaft portion 2 fed by the rotating-shaft-feeding mechanism 18 is fed and the distance over which the thread gauge 1 mounted on the rotating-shaft portion 2 advances, the outward-moving portion 23 moves outward from the threaded hole in a direction opposite to the threaded-hole-approaching direction over a distance equivalent to the difference; the threaded-hole inspection device being configured to measure a depth of the threaded hole 4 on the basis of a number of rotations and thread pitch of the rotating-shaft-feeding mechanism 18 and on the basis of the distance over which the outward-moving portion 23 moves outward from the threaded hole, and to inspect the depth of the threaded hole 4.

More specifically, the present example is configured to be composed of: a device base body portion 11; a moving inspection portion 12 provided to the device base body portion 11 so as to be capable of moving vertically, the moving inspection portion having provided thereto the thread gauge 1, the rotating-shaft portion 2, the rotary drive portion 3, the rotating-shaft-feeding mechanism 18, and the outward-moving portion 23 described above; and a workpiece placement platform portion 13 for placing a workpiece W into which a threaded hole 4 for inspection is machined, the workpiece placement platform portion 13 being arranged below the moving inspection portion 12. The moving inspection portion 12 is caused to approach and descend into the threaded hole 4 to be inspected (referred to simply as a threaded hole 4 below) machined into the workpiece W that is placed on the workpiece placement platform portion 13, and a tip portion of the thread gauge 1 provided to the moving inspection portion 12 is brought in contact with the threaded hole 4. The rotary drive portion 3 is driven in a state in which the thread gauge 1 is in contact with the threaded hole 4, and the thread gauge 1 is rotated and progressively twisted into the threaded hole 4. An amount of twisting by which the thread gauge 1 is twisted into the threaded hole 4 (distance over which the thread gauge 1 advances), i.e., a depth of the threaded hole 4 is measured (calculated) on the basis of: a distance over which the rotating-shaft portion 2 is fed, which is established on the basis of a number of rotations and thread pitch of the rotating-shaft-feeding mechanism 18 during twisting of the thread gauge 1 into the threaded hole 4; and a distance over which the outward-moving portion 23 moves outward from the threaded hole. It is determined on the basis of the measured result (calculated result) whether an inspection pertaining to the depth of the threaded hole 4 is satisfactory.

The threaded-hole inspection device of the present example is described in further detail below.

The thread gauge 1 of the present example is configured so that an incomplete thread ridge portion produced during formation of a thread (external thread) is removed, and moreover is configured so that a risk of an incomplete thread ridge portion cutting into the threaded hole 4 and creating an adverse effect in a separation operation when the thread gauge 1 is fully threaded into the threaded hole 4 is reduced as much as possible.

The thread gauge 1 of the present example is also configured to be provided with a contacting engaging portion 10 that comes into contact and engages with the rotating-shaft portion 2 when the thread gauge 1 is inserted and mounted, or fitted and mounted, into the rotating-shaft portion 2.

More specifically, the contacting engaging portion 10 is shaped as a flange, and the flange-shaped contacting engaging portion 10 is configured to come into contact with a tip portion of the rotating-shaft portion 2 when the thread gauge 1 is inserted into the rotating-shaft portion 2, thereby restricting the amount of insertion of the thread gauge 1 into the rotating-shaft portion 2.

Specifically, in the present example, inserting a fastening portion into the rotating-shaft portion 2 until the contacting engaging portion 10 provided to the thread gauge 1 comes into contact and engages with the rotating-shaft portion 2 when mounting the thread gauge 1 on the rotating-shaft portion 2 fixes the amount of insertion of the fastening portion into the rotating-shaft portion 2. A configuration is thereby adopted in which an amount of protrusion of the thread gauge 1 mounted on the rotating-shaft portion 2 is fixed.

The rotating-shaft portion 2, on which the thread gauge 1 is detachably mounted, is configured to be fed by the rotating-shaft-feeding mechanism 18 in the threaded-hole-approaching direction, which is a direction of approach toward the threaded hole 4 to be inspected, and also is configured to be provided with a rotating shaft telescoping operation portion 15 that causes the rotating-shaft portion 2 to perform a telescoping operation during such feeding.

More specifically, the rotating-shaft-feeding mechanism 18 of the present example is configured to feed the rotating-shaft portion 2 due to threading together of a threaded part 19 and a nut 20.

Even more specifically, the rotating-shaft-feeding mechanism 18 is configured to be composed of a threaded part 19 provided to the rotating-shaft portion 2, and a nut 20 provided to the outward-moving portion 23, which is provided to a moving-housing portion 21 in which the rotating-shaft portion 2 is arranged. The rotating-shaft-feeding mechanism 18 is configured so that the threaded part 19 provided to the rotating-shaft portion 2 is threaded (progressively threaded) into the nut 20 provided to the outward-moving portion 23 and feeds the rotating-shaft portion 2 in the threaded-hole-approaching direction due to the rotating-shaft portion 2 rotating forward (clockwise) via forward rotational driving from the rotary drive portion 3, and so that the rotating-shaft portion 2 is fed outward from the threaded hole in a direction opposite to the threaded-hole-approaching direction due to the rotating-shaft portion 2 rotating backward (counter-clockwise) via backward rotational driving from the rotary drive portion 3.

The rotating shaft telescoping operation portion 15 of the present example is configured to extend when the rotating-shaft portion 2 is fed in the threaded-hole-approaching direction by the rotating-shaft-feeding mechanism 18, and to retract when the rotating-shaft portion 2 that has been fed in the threaded-hole-approaching direction is fed outward from the threaded hole by the rotating-shaft-feeding mechanism 18 in order to return to an initial position. More specifically, the rotating shaft telescoping operation portion 15 of the present example is configured to be composed of a spline shaft portion (not shown) and a spline bearing portion (not shown).

Even more specifically, in the present example, the spline shaft portion is linked to the rotary drive portion 3 and transmits rotational driving from the rotary drive portion 3 to the rotating-shaft portion 2. Due to movement of the spline bearing portion in an axial direction in relation to the spline shaft portion, the rotating-shaft portion 2 rotates so as to be capable of telescoping.

The outward-moving portion 23 to which the nut 20 of the rotating-shaft-feeding mechanism 18 described above is provided is configured so that, when a difference is created between the distance over which the rotating-shaft portion 2 fed by the rotating-shaft-feeding mechanism 18 is fed, i.e., by the threading together of the threaded part 19 and the nut 20 described above, and the distance over which the thread gauge 1 mounted on the rotating-shaft portion 2 advances, the outward-moving portion moves outward from the threaded hole opposite the threaded-hole-approaching direction, which is a feed direction of the rotating-shaft portion 2, over a distance equivalent to the difference.

More specifically, the outward-moving portion 23 of the present example is configured to be provided in a state in which rotation relative to the moving-housing portion 21 is prevented due to a rotation-preventing guide portion (not shown), and also provided so as to be capable of moving vertically relative to the moving-housing portion 21 along the rotation-preventing guide portion (the outward-moving portion being guided thereby).

Even more specifically, the outward-moving portion 23 of the present example is positioned at and urged toward a prescribed position by positioning urging means, and more specifically is positioned at and urged toward a position at which the outward-moving portion is in contact with and supported by a retaining support portion (not shown) provided to a lower end of the rotation-preventing guide portion. A configuration is adopted in which, when a difference is created between the distance over which the rotating-shaft portion 2 fed by the rotating-shaft-feeding mechanism 18 is fed and the distance over which the thread gauge 1 mounted on the rotating-shaft portion 2 advances, the outward-moving portion 23 resists an urging force of the positioning urging means and moves outward from the threaded hole commensurately with the difference.

Specifically, the present example is configured so as to establish, from the distance over which the outward-moving portion 23 moves outward from the threaded hole, both a difference between the distance over which the rotating-shaft portion 2 is fed and the distance over which the thread gauge 1 advances that is produced when there is a phase difference between the tip-side start point of a complete thread ridge of the thread gauge 1 mounted on the rotating-shaft portion 2 and a thread-start position in the threaded hole 4 in the workpiece W that is placed on the workpiece placement platform portion 13, and a difference between the distance over which the rotating-shaft portion 2 is fed and the distance over which the thread gauge 1 advances that is produced due to a difference in pitch being produced in certain cases (more specifically, in cases where the thread pitch of the threaded part 19 is greater than the thread pitch of the thread gauge 1) between the thread pitch of the thread gauge 1 mounted on the rotating-shaft portion 2 and the thread pitch of the rotating-shaft-feeding mechanism 18, i.e., the thread pitch of the threaded part 19 that feeds the rotating-shaft portion 2.

The present example is configured to have outward-movement-amount-measuring means 24 that measures the distance over which the outward-moving portion 23 moves outward from the threaded hole. More specifically, the present example is configured so that a proximity sensor 24 is used as the outward-movement-amount-measuring means 24.

The proximity sensor 24 is provided facing the outward-moving portion 23 along an outward direction, which is the direction in which the outward-moving portion 23 moves, and moreover is configured to measure a distance gap with respect to the outward-moving portion 23 and measure (acquire) an amount of change in the distance gap as the distance over which the outward-moving portion 23 moves.

Furthermore, the present example is configured to have: number-of-rotations-measuring means that measures the number of rotations of the rotating-shaft-feeding mechanism 18, more specifically the number of rotations of the threaded part 19; and a threaded hole depth computation unit that calculates the depth of the threaded hole 4. The threaded hole depth computation unit is configured to: subtract the distance over which the outward-moving portion 23 moves as inputted from the outward-movement-amount-measuring means 24 (proximity sensor 24) from the distance over which the rotating-shaft portion 2 is fed, i.e., an apparent threaded hole depth dimension, which is acquired on the basis of the number of rotations of the rotating-shaft-feeding mechanism 18 (threaded part 19) as inputted from the rotation-measuring means and a preset thread pitch of the rotating-shaft-feeding mechanism 18 (threaded part 19); acquire a true depth dimension of the threaded hole 4; and inspect the depth of the threaded hole 4 on the basis of the depth dimension of the threaded hole 4 that was computed and acquired by the threaded hole depth computation unit.

The present example is also configured to have threaded-hole-fault-sensing means (not shown) for sensing faults in formation of the threaded hole in situations in which the thread gauge 1 is not twisted into the threaded hole 4 even when the rotating-shaft portion 2 is rotating due to rotational driving from the rotary drive portion 3 and twisting of the thread gauge 1 into the threaded hole 4 is started due to rotation of the rotating-shaft portion 2, i.e., in cases in which a fault has occurred in the formation of the threaded hole.

More specifically, the present example is configured to have a touch sensor as the threaded-hole-fault-sensing means. The touch sensor is configured to be provided at a position set apart from the outward-moving portion 23 described above by a prescribed gap, more specifically a position that is in contact in cases in which twisting of the thread gauge 1 into the threaded hole 4 does not advance relative to feeding of the rotating shaft portion 2 due to, inter alia, an adverse effect in the formation of the threaded hole 4, and in which the outward-moving portion 23 moves at least a prescribed distance outward from the threaded hole. The touch sensor is moreover configured so that a switch for a signal indicating that a fault has been sensed due to the outward-moving portion 23 having moved and contacted the touch sensor (e.g., a signal for stopping the rotary drive portion 3 or a signal that reports a fault) is on. The threadedhole-fault-sensing means is not limited to being a touch sensor; any [means] can be suitably employed, provided that it is possible to sense that the outward-moving portion 23 has moved by at least a prescribed value.

Furthermore, the rotating-shaft portion 2 of the present example is configured to be provided with an axial-deviation-permitting portion 22 that permits eccentricity, declination, and other such forms of axial deviation of the rotating-shaft portion 2.

More specifically, the rotating-shaft portion 2 of the present example is configured so that a double-type universal joint 22 that is the axial-deviation-permitting portion 22 is provided partway along a length direction (more specifically, between the rotating shaft telescoping operation portion 15 and the threaded part 19) of the rotating-shaft portion 2. Even when, for example, there is a slight positional deviation between a center axis of the thread gauge 1 and a center axis of the threaded hole 4, the thread gauge 1 mounted on the tip portion of the rotating-shaft portion 2 positionally deviates (moves horizontally) due to the axial-deviation-permitting portion 22 (universal joint 22) so as to be threaded into the threaded hole 4 and is threaded into the threaded hole 4, and it is possible to perform a rotation operation and to twist the thread gauge 1 into the threaded hole 4 while there remains an eccentric state in which the center axis of the thread gauge 1 threaded into the threaded hole 4 positionally deviates from a center axis of a rotating shaft of the rotary drive portion 3.

The operation and effect of the threaded-hole inspection device of the present example configured as described above is described below.

Specific Example 1

When the rotating-shaft portion 2 rotates due to rotational driving from the rotary drive portion 3 in cases in which the thread pitch of the thread gauge 1 and the thread pitch of the threaded part 19 of the rotating-shaft-feeding mechanism 18 are the same pitch, the rotating-shaft portion 2 is fed in the threaded-hole-approaching direction over a distance equivalent to the distance over which the thread gauge 1 advances, i.e., the twisting into the threaded hole 4.

At the start of twisting of the thread gauge 1 into the threaded hole 4, in cases in which a phase difference has been created between the tip-side start point of the complete thread ridge of the thread gauge 1 and the thread-start position in the threaded hole 4, the thread gauge 1 does not advance until the tip-side start point of the complete thread ridge of the thread gauge 1 reaches the thread-start position in the threaded hole 4 and twisting is started, and the outward-moving portion 23 moves outward from the threaded hole is over a distance equivalent to the distance over which the rotating-shaft portion 2 is fed during the period until the tip-side start point of the complete thread ridge of the thread gauge 1 reaches the thread-start position in the threaded hole 4.

Thereafter (after the tip-side start point of the complete thread ridge of the thread gauge 1 has reached the thread-start position in the threaded hole 4 and twisting has started), the distance over which the rotating-shaft portion 2 is fed and the distance over which the thread gauge 1 advances are the same during twisting of the thread gauge 1 into the threaded hole 4. Therefore, no difference is created between the distance over which the rotating-shaft portion 2 is fed and the distance over which the thread gauge 1 advances, and the outward-moving portion 23 does not move.

Accordingly, in cases in which there is no phase difference between the tip-side start point of the complete thread ridge of the thread gauge 1 and the thread-start position in the threaded hole 4, the depth of the threaded hole 4 (distance over which the thread gauge 1 advances) can be established from a value obtained by multiplying together the number of rotations of the threaded part 19 (rotating-shaft portion 2) as measured by the number-of-rotations-measuring means and the thread pitch of the threaded part 19 because the depth of the threaded hole 4 is the same as the distance over which the rotating-shaft portion 2 is fed. In cases in which there is a phase difference between the tip-side start point of the complete thread ridge of the thread gauge 1 and the thread-start position in the threaded hole 4 and the outward-moving portion 23 has moved, the depth of the threaded hole 4 can be established from a value obtained by subtracting the distance over which the outward-moving portion 23 moves as measured by the outward-movement-amount-measuring means 24 (proximity sensor 24) from the distance over which the rotating-shaft portion 2 is fed, which is established by multiplying together the number of rotations of the threaded part 19 (rotating-shaft portion 2) as measured by the number-of-rotations-measuring means and the thread pitch of the threaded part 19. In the present example, these computations are performed by the threaded hole depth computation unit.

Specific Example 2

In cases in which the thread pitch of the thread gauge 1 and the thread pitch of the threaded part 19 of the rotating-shaft-feeding mechanism 18 are different from each other, more specifically in cases in which the thread pitch of the thread gauge 1 is less (narrower) than the thread pitch of the threaded part 19 of the rotating-shaft-feeding mechanism 18, a difference is created between the distance over which the rotating-shaft portion 2 is fed and the distance over which the thread gauge 1 advances, but the difference between the distance over which the rotating-shaft portion 2 is fed and the distance over which the thread gauge 1 advances is accounted for by movement of the outward-moving portion 23 outward from the threaded hole. This makes it possible to measure the depth of the threaded hole 4 on the basis of the number of rotations and thread pitch of the threaded part 19 even when the thread pitch of the thread gauge 1 differs from the thread pitch of the rotating-shaft-feeding mechanism 18 (threaded part 19) in the present example.

The depth of the threaded hole 4 (distance over which the thread gauge 1 advances) can be established, in the same manner as in cases in which there is a phase difference as described in specific example 1, from a value obtained by subtracting the distance over which the outward-moving portion 23 moves as measured by the outward-movement-amount-measuring means 24 (proximity sensor 24) from the distance over which the rotating-shaft portion 2 is fed, which is established by multiplying together the number of rotations of the threaded part 19 (rotating-shaft portion 2) as measured by the number-of-rotations-measuring means and the thread pitch of the threaded part 19.

Thus, in the present example, even when there is a phase difference between the tip-side start point of the complete thread ridge of the thread gauge 1 mounted on the rotating-shaft portion 2 and the thread-start position in the threaded hole 4, it is possible to exclude measurement error produced due to the phase difference and accurately measure the depth of the threaded hole 4. Moreover, even if one thread gauge 1 is replaced with (exchanged for) a different thread gauge 1 having a different thread pitch, it is unnecessary to reset the thread pitch as in the past because the depth of the threaded hole 4 is measured on the basis of the number of rotations of the threaded part 19 of the rotating-shaft-feeding mechanism 18 (i.e., the number of rotations of the rotating-shaft portion 2) and the thread pitch of the threaded part 19. Accordingly, there is achieved an innovative threaded-hole inspection device which has exceptional utility and with which there is no risk of adverse inspection events occurring due to forgetting to reset the thread pitch or incorrectly resetting the thread pitch.

The present invention is not limited to the above examples 1 and 2; a specific configuration under the above configuration conditions can be designed as appropriate.

KEY

1 Thread gauge
2 Rotating-shaft portion
3 Rotary drive portion
4 Threaded hole
5 Gauge portion
6 Fastening portion
7 Tip-side start point of complete thread ridge
8 Phase-positioning portion
9 Phase-positioning engaging portion
10 Contacting engaging portion
18 Rotating-shaft-feeding mechanism
19 Threaded part
20 Nut
21 Moving-housing portion
23 Outward-moving portion
24 Outward-movement-amount-measuring means

The invention claimed is:

1. A threaded-hole inspection device comprising a thread gauge, a rotating-shaft portion on which the thread gauge is detachably mounted, and a rotary drive portion that rotates the rotating-shaft portion to rotate the thread gauge mounted on the rotating-shaft portion, the threaded-hole inspection device being configured so that: the thread gauge is twisted into a threaded hole to be inspected; a depth dimension of the threaded hole is measured on the basis of a number of rotations from when twisting of the thread gauge into the threaded hole starts until the twisting is complete, and on the basis of a thread pitch of the thread gauge; and the depth dimension of the threaded hole is inspected; wherein the threaded-hole inspection device is characterized in that: the thread gauge is configured so that a gauge portion to be twisted into the threaded hole is provided to a tip portion of the thread gauge, and a fastening portion that fastens to the rotating-shaft portion is provided to a base portion of the thread gauge; the gauge portion is configured so that an incomplete thread ridge portion produced on a tip portion of the gauge portion during formation of a thread is removed; the fastening portion is configured so that a phase-positioning portion is provided thereto, the phase-positioning portion positioning a tip-side start point of a complete thread ridge portion of the gauge portion at a prescribed phase when the thread gauge is mounted on the rotating-shaft portion; and the rotating-shaft portion is provided with a phase-positioning engaging portion that engages with the phase-positioning portion.

2. The threaded-hole inspection device according to claim 1, characterized in that a plurality of thread gauges having different pitches and outer diameters are provided, and the thread gauges are configured to be replaceably mounted.

3. The threaded-hole inspection device according to claim 1 or 2, characterized in that the phase-positioning portion is provided at a fixed phase position relative to the tip-side start point of the complete thread ridge.

4. The threaded-hole inspection device according to claim 1 or 2, characterized in that the thread gauge is configured so that: there is provided a contacting engaging portion that comes into contact and engages with the rotating-shaft portion when the fastening portion is inserted and mounted, or fitted and mounted, into the rotating-shaft portion; and by causing the contacting engaging portion to come into contact and engage with the rotating-shaft portion and inserting and mounting, or fixing and mounting, the fastening portion into the rotating-shaft portion, an amount of insertion or an amount of fitting of the fastening portion into the rotating-shaft portion is fixed, and an amount of protrusion of the thread gauge mounted on the rotating-shaft portion is fixed.

5. A threaded-hole inspection device characterized by having: a thread gauge; a rotating-shaft portion on which the thread gauge is detachably mounted; a rotary drive portion that rotates the rotating-shaft portion to rotate the thread gauge mounted on the rotating-shaft portion; a rotating-shaft-feeding mechanism that, by threaded engagement, feeds the rotating-shaft portion in a threaded-hole-approaching direction, which is a direction of approach toward a threaded hole to be inspected, the rotating-shaft portion being caused to rotate by the rotary drive portion; and an outward-moving portion that, when a difference is created between a distance over which the rotating-shaft portion fed by the rotating-shaft-feeding mechanism is fed and a distance over which the thread gauge mounted on the rotating-shaft portion advances, moves outward from the threaded hole in a direction opposite to the threaded-hole-approaching direction commensurately with the difference in the distances; the threaded-hole inspection device being configured so that a depth of the threaded hole is measured on the basis of a number of rotations and thread pitch of the rotating-shaft-feeding mechanism and on the basis of a distance over which the outward-moving portion moves outward from the threaded hole, and the depth of the threaded hole is inspected.

6. The threaded-hole inspection device according to claim 5, characterized in that: the rotating-shaft-feeding mechanism is composed of a threaded part provided to the rotating-shaft portion, and a nut that is threaded onto the threaded part; the nut being configured to be provided to the outward-moving portion in a state in which rotation relative to a moving-housing portion in which the rotating-shaft portion is arranged is prevented, and also to be provided so as to be capable of moving vertically.

7. The threaded-hole inspection device according to claim 5 or 6, characterized in that the outward-moving portion is positioned at and urged toward a prescribed position by positioning urging means, and is configured so that, when a difference is created between the distance over which the rotating-shaft portion is fed and the distance over which the thread gauge advances, the outward-moving portion moves outward from the threaded hole commensurately with the difference in distance, against an urging force of the positioning urging means.

8. The threaded-hole inspection device according to claim 5 or 6, characterized by having outward-movement-amount-measuring means for measuring the distance over which the outward-moving portion moves, and by being configured so that the depth of the threaded hole is measured on the basis of the number of rotations and thread pitch of the rotating-shaft-feeding mechanism and on the basis of the distance over which the outward-moving portion moves as measured by the outward-movement-amount-measuring means.

9. The threaded-hole inspection device according to claim 8, characterized in that the outward-movement-amount-measuring means is configured to measure a distance gap with respect to the outward-moving portion and acquire an amount of change in the distance gap as the distance over which the outward-moving portion moves.

10. The threaded-hole inspection device according to claim 5, characterized by having number-of-rotations-measuring means that measures the number of rotations of the rotating-shaft-feeding mechanism, outward-movement-amount-measuring means for measuring the distance over which the outward-moving portion moves, and a threaded hole depth computation unit that calculates the depth of the threaded hole, the threaded hole depth computation unit being configured to: subtract the distance over which the outward-moving portion moves as inputted from the outward-movement-amount-measuring means from the distance over which the rotating-shaft portion is fed, which is acquired on the basis of the number of rotations of the rotating-shaft-feeding mechanism as inputted from the rotation-measuring means and a preset thread pitch of the rotating-shaft-feeding mechanism; acquire a depth dimension of the threaded hole; and inspect the depth of the threaded hole on the basis of the depth dimension of the threaded hole that was computed and acquired by the threaded hole depth computation unit.

* * * * *